United States Patent
Wason et al.

(10) Patent No.: US 11,481,563 B2
(45) Date of Patent: Oct. 25, 2022

(54) TRANSLATING TEXTS FOR VIDEOS BASED ON VIDEO CONTEXT

(71) Applicant: Adobe Inc., San Jose, CA (US)

(72) Inventors: Mahika Wason, New Delhi (IN); Amol Jindal, Patiala (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 352 days.

(21) Appl. No.: 16/678,378

(22) Filed: Nov. 8, 2019

(65) Prior Publication Data
US 2021/0141867 A1    May 13, 2021

(51) Int. Cl.
*G06F 40/58*    (2020.01)
*G06V 20/40*    (2022.01)
*G06N 3/08*    (2006.01)
*G06N 3/04*    (2006.01)

(52) U.S. Cl.
CPC .......... *G06F 40/58* (2020.01); *G06N 3/0445* (2013.01); *G06N 3/0454* (2013.01); *G06N 3/08* (2013.01); *G06V 20/46* (2022.01)

(58) Field of Classification Search
CPC ................ G06F 40/58; G06V 20/46
See application file for complete search history.

(56) References Cited

U.S. PATENT DOCUMENTS

| | | | |
|---|---|---|---|
| 11,244,111 B2* | 2/2022 | Lu ........................ | G06V 10/469 |
| 2006/0136193 A1* | 6/2006 | Lux-Pogodalla ..... | G06F 40/143 |
| | | | 704/2 |
| 2020/0097604 A1* | 3/2020 | Lee ....................... | G06N 3/0445 |
| 2020/0137463 A1* | 4/2020 | Kumar ................. | G09B 21/008 |

OTHER PUBLICATIONS

Hitschler, J., Schamoni, S., & Riezler, S. (2016). Multimodal pivots for image caption translation. arXiv preprint arXiv:1601.03916.*

* cited by examiner

*Primary Examiner* — Bryan S Blankenagel
(74) *Attorney, Agent, or Firm* — Keller Preece PLLC

(57) ABSTRACT

The present disclosure describes systems, non-transitory computer-readable media, and methods that can generate contextual identifiers indicating context for frames of a video and utilize those contextual identifiers to generate translations of text corresponding to such video frames. By analyzing a digital video file, the disclosed systems can identify video frames corresponding to a scene and a term sequence corresponding to a subset of the video frames. Based on images features of the video frames corresponding to the scene, the disclosed systems can utilize a contextual neural network to generate a contextual identifier (e.g. a contextual tag) indicating context for the video frames. Based on the contextual identifier, the disclosed systems can subsequently apply a translation neural network to generate a translation of the term sequence from a source language to a target language. In some cases, the translation neural network also generates affinity scores for the translation.

20 Claims, 14 Drawing Sheets

TRANSLATING TEXTS FOR VIDEOS BASED ON VIDEO CONTEXT

BACKGROUND

In recent years, software engineers have developed machine translation systems to analyze various texts and automatically generate translations of such texts. For example, some machine translation systems generate term-by-term translations of text entered into websites, subtitles for videos, and news articles. In some such cases, conventional machine translation systems translate each term in a text from a source language to a target language without reference to surrounding text or with reference to a term's surrounding text. Despite quickly generating such translations, conventional machine translation systems often inaccurately translate texts. By primarily analyzing a text in a source language, conventional machine-translation systems routinely mistranslate homonyms, idiomatic expressions, or slang in video subtitles and other texts from a source language to a target language. To take but a few examples, some conventional machine-translation systems translate terms of endearment like "pumpkin" or "honey" to food rather than to an analogous terms of endearment in a target language.

SUMMARY

This disclosure describes embodiments of methods, non-transitory computer readable media, and systems that can generate contextual identifiers indicating context for frames of a video and utilize those contextual identifiers to generate translations of text corresponding to such video frames. By analyzing a digital video file, in some implementations, the disclosed systems identify video frames corresponding to a scene and a term sequence corresponding to a subset of the video frames. Based on images features of the video frames corresponding to the scene, the disclosed systems utilize a contextual neural network to generate a contextual identifier (e.g. a contextual tag) indicating context for the video frames. Based on the contextual identifier, the disclosed systems subsequently apply a translation neural network to generate a translation of the term sequence from a source language to a target language. In some cases, the translation neural network also generates affinity scores for the translation, where such an affinity score reflects an affinity between the contextual identifier relied upon for the translation and a translated term, a translated phrase, or other portion of the translation.

BRIEF DESCRIPTION OF THE DRAWINGS

The detailed description refers to the drawings briefly described below.

DETAILED DESCRIPTION

Figure 1:
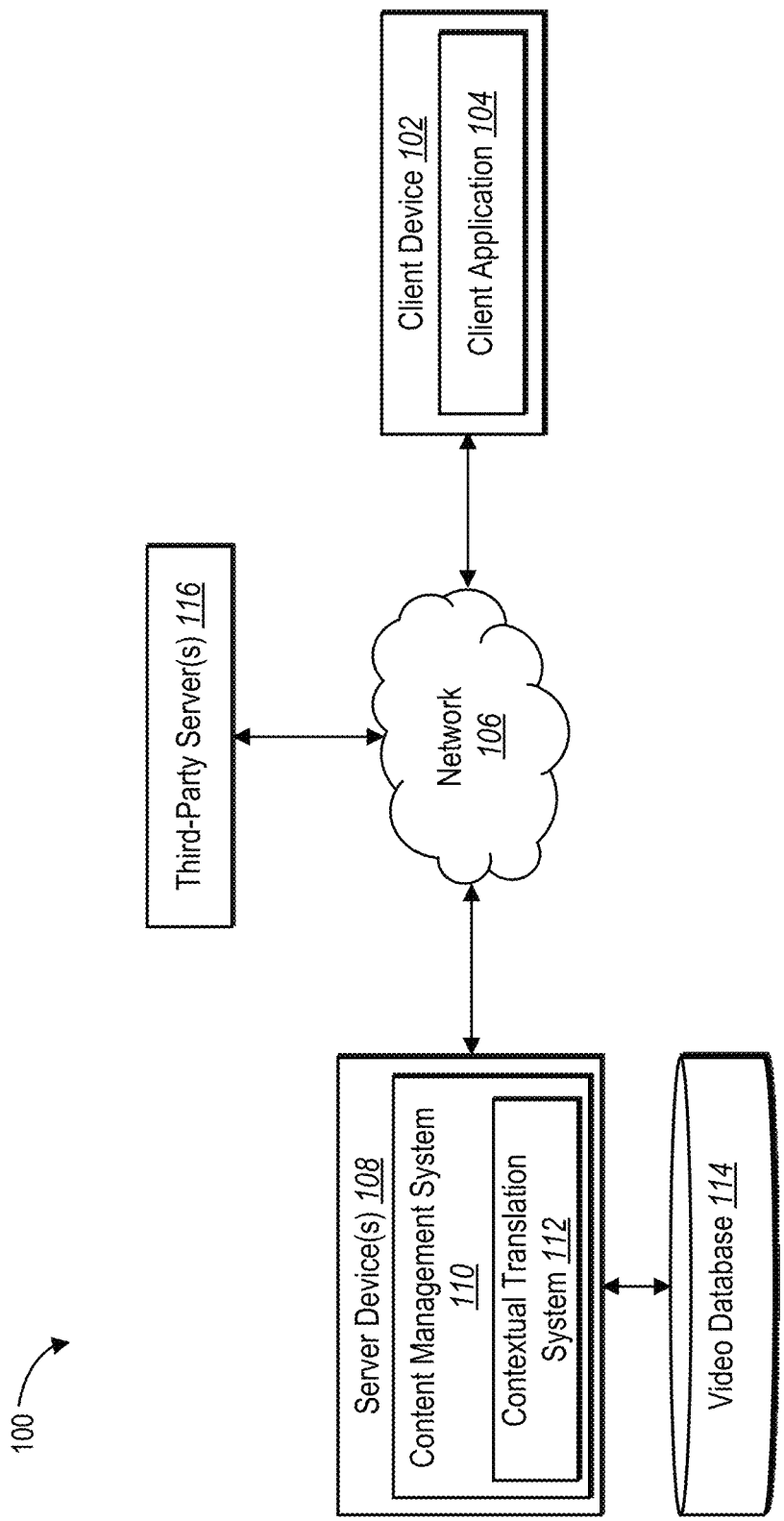
FIG. 1 illustrates a diagram of an environment in which a content management system and a contextual translation system can operate in accordance with one or more embodiments.

This disclosure describes one or more embodiments of a contextual translation system that can translate text corresponding to a digital video file based on contextual identifiers indicating context for video frames of the digital video file. By analyzing a digital video file, for example, the contextual translation system identifies a set of video frames corresponding to a scene and a term sequence corresponding to a subset of video frames. Based on images features of the set of video frames, the contextual translation system utilizes a contextual neural network to generate a contextual identifier indicating context for the set of video frames. Based on the contextual identifier, the contextual translation system subsequently applies a translation neural network to generate (i) an initial translation of the term sequence from a source language to a target language and (ii) affinity scores for the initial translation. Such an affinity score reflects an affinity between the contextual identifier relied upon for the translation and a translated term (or other translated portion) from the initial translation. By using a feedback loop to incrementally adjust translations of term sequences corresponding to a scene, in some embodiments, the contextual translation system improves translations of such term sequences (e.g., for video subtitles).

As noted above, the contextual translation system identifies a set of video frames corresponding to a scene. In some embodiments, for instance, the contextual translation system identifies a set of frames corresponding to a scene based on the similarity of image features between (or among) contiguous frames within a video. Alternatively, the contextual translation system identifies a set of frames corresponding to a scene based on metadata associated with frames within the video. By analyzing image features or identifying metadata corresponding to different scenes, the contextual translation system can identify different sets of frames corresponding to different scenes within a digital video file.

In addition to identifying a set of video frames corresponding to a scene, in some embodiments, the contextual translation system identifies a term sequence corresponding to a subset of frames. For instance, in some cases, the contextual translation system identifies a phrase, a sentence fragment, or a sentence from subtitles corresponding to a video frame (or a subset of video frames) within the larger set of video frames of a scene. Accordingly, such a term sequence may represent a portion of dialogue or description in a subtitle for a video. As the contextual translation system translates each term sequence corresponding to different subsets of frames and to different scenes, in some implementations, the contextual translation system generates contextual translations for subtitles or other texts corresponding to a video.

As indicated above, the contextual translation system utilizes a contextual neural network to generate contextual identifiers. For instance, the contextual neural network generates a set of contextual identifiers indicating context for a set of frames corresponding to a scene. To generate such contextual identifiers, in some embodiments, the contextual translation system applies a contextual neural network to a set of frames, where such a network includes convolutional layers and long-short-term-memory (LSTM) layers. In some cases, the contextual translation system applies convolutional layers to generate a frame vector based on a frame from a set of frames corresponding to a scene. The contextual translation system further applies the LSTM layers to generate contextual identifiers based on the frame vector (or a series of frame vectors) from the convolutional layers.

As suggested above, in some implementations, contextual identifiers include terms or phrases reflecting contextual features of a scene from a digital video file. That is, contextual identifiers can indicate information about the context of a scene. For instance, a contextual identifier may include, but is not limited to, terms or phrases reflecting a genre or a nature of a scene, a tone or mood of the scene, relationships between objects or individuals in the scene, or actions taking place in the scene.

Based on contextual identifiers, the contextual translation system utilizes a translation neural network to generate contextual translations for term sequences. For example, the contextual translation system can apply an encoder network and a decoder network from a translation neural network to both a term sequence and corresponding contextual identifiers. By applying an encoder recurrent neural network and a decoder recurrent neural network from a translation neural network, for example, the contextual translation system generates a contextual translation of the term sequence. In some implementations, the encoder recurrent neural network generates an encoded vector based on a term sequence and corresponding contextual identifiers, and the decoder recurrent neural network generates a translation of the term sequence from a source language to a target language.

In addition to generating a translation, in some embodiments, the translation neural network also generates affinity scores for a translation of a term sequence. As indicated above, an affinity score reflects an affinity between a particular contextual identifier and a translated term, translated phrase, or other portion of a translation in a target language. Because the contextual neural network can generate a set of contextual identifiers corresponding to a single scene, the translation neural network can generate a set of affinity scores for a translation reflecting affinities between particular contextual identifiers and particular translated terms (or other portions) from the translation in the target language.

As further indicated above, in some implementations, the contextual translation system iteratively translates term sequences corresponding to a digital video file. In one or more embodiments, the term sequences represent subtitles or other texts corresponding to the digital video file. By translating subtitles term-sequence-by-term-sequence, the contextual translation system can sequentially translate subtitles as they appearance in a digital video. In some cases, the contextual translation system further provides such translated subtitles to a client device to present within graphical user interface for a video.

To improve the accuracy of a contextual translation, in some embodiments, the contextual translation system implements a feedback loop based on affinity scores for translations of term sequences. When implementing a feedback loop, in some cases, the contextual translation system assigns weights to contextual identifiers and adjusts those weights based on changes to affinity scores for translations of different term sequences over multiple iterations. Based on a feedback threshold, the contextual translation system identifies changes to affinity scores corresponding to different contextual translations. When affinity scores satisfy such a threshold, the contextual translation system adjusts the assigned weights and (in some cases) changes contextual translations to reflect the adjusted weights.

For example, in some cases, the contextual translation system determines initial affinity scores for an initial translation of a particular term sequence and subsequent affinity scores for translations of subsequent term sequences. Based on determining that the subsequent affinity scores satisfy a feedback threshold relative to the initial affinity scores, the contextual translation system determines (or adjusts) a set of weights for contextual identifiers corresponding to the particular term sequence. The contextual translation system further generates an updated translation of the particular term sequence utilizing the set of weights (or adjusted set of weights) for the contextual identifiers.

As suggested above, conventional machine-translation systems frequently mistranslate texts and exhibit a number of technical deficiencies. For example, conventional machine-translation systems frequently mistranslate homonyms, idioms, and other terms based primarily on the text in a source language. In some cases, conventional machine-translation systems translate a term from a source language to a target language based on the most common usage or common meaning of the term in the source language. Thus, conventional machine-translation systems frequently generate translations that do not make sense in the target language.

For instance, conventional machine-translation systems, including conventional machine learning models, frequently generate translations with fundamentally different meanings than those in the source text. By applying term-by-term translation, conventional machine-translation systems frequently fail to identify and properly translate phrases or terms that rely on context for understanding. For example, many conventional machine-translation systems cannot generate accurate translations for various turns of phrase, figurative terms, and/or homonyms in the source language.

In addition to mistranslating terms or phrases, some conventional machine-translation systems rigidly rely on some form of text alone to translate a given text. By analyzing a given text in a source language primarily or exclusively from a textual perspective—even when analyzing text surrounding a term, phrase, or sentence to be translated—some conventional machine-translation systems fail to consider other sources relevant to the given text. Such conventional machine-translation systems lack machine learning or algorithms to consider non-textual cues relevant to translation.

In addition to the inaccuracies and inflexibility of conventional machine-translation systems, conventional image-analysis systems exhibit technical deficiencies relevant to the contextual translation system. As currently available, conventional image-analysis systems can detect objects or colors within an image. For example, a conventional image-analysis system may detect (and generate a conventional tag for) a person, a face, a specific color, or a text within a particular image. But such image analysis narrowly limits conventional tags to visible objects or other visible features readily apparent within an image.

As disclosed herein, the contextual translation system more accurately and flexibly translates texts corresponding to an image or video than conventional machine-translation systems and detects context from video frames with more flexibility and nuance than conventional image-analysis systems. By translating text corresponding to a digital video file based on contextual identifiers indicating context for video frames, for example, the disclosed contextual translation system improves the accuracy with which machine-translation systems translate text corresponding to a video. To more accurately translate term sequences corresponding to video frames, the disclosed contextual translation system uses both (i) a contextual neural network to generate contextual identifiers for video frames and (ii) a translation neural network to generate translations of term sequences corresponding to such video frames. By training and applying both such neural networks, the contextual translation system can better translate a variety of terms or phrases, such as by accurately translating homonyms, idiomatic expressions, or slang based on contextual identifiers. Because the contextual translation system further trains and applies the translation neural network to generate affinity scores, the contextual translation system likewise generates translations of terms with better affinity to the images features in corresponding video frames.

In addition to improved translation in a single iteration, in some embodiments, the contextual translation system further implements a feedback loop to improve the accuracy of translations of term sequences based on affinity scores. By comparing affinity scores for translated terms corresponding to contextual identifiers across multiple iterations, the contextual translation system adjusts weights for such contextual identifiers and improves the accuracy of contextual translations based on the adjusted weights. Unlike conventional systems that generate static translations, therefore, the contextual translation system can flexibly refine and improve translations to reflect affinity scores with adjusted weights for contextual identifiers.

Beyond improved translation, in some implementations, the contextual translation system uses a contextual neural network to capture context that conventional image-analysis systems cannot detect. In contrast to mere objects or colors detected in an image, the contextual translation system generates contextual identifiers for video frames reflecting more complex concepts than those detected by a conventional image-analysis system. By analyzing image features of video frames, the contextual neural network identifies (and generates contextual identifiers) representing such complex concepts ranging from (but not limited to) a genre or a nature of a scene to actions taking place in the scene.

Based on such contextual identifiers, the disclosed contextual translation system improves the flexibility with which machine-translation system translate term sequences. Rather than merely analyze textual features, the disclosed contextual translation system applies neural networks to analyze both term sequences and contextual identifiers from video frames. By capturing contextual cues from a video frame's image features, the contextual translation system can capture a non-textual reference point upon which to translate a term sequence.

As indicated by the foregoing description, this disclosure describes various features and advantages of the contextual translation system. As used in this disclosure, a digital video file includes any of a variety of file types including a series (or a sequence) of images. For instance, a digital video file can include digital video frames. Relatedly, as used in this disclosure, a frame (or a video frame) includes a single digital image in a series (or a sequence) of images. Such a frame may constitute a digital image from a sequence of images for a video.

Additionally, a scene includes a portion of video comprising distinctive image features. In some cases, a scene includes a set of frames within a video comprising image features distinct to a measurable or threshold degree from other frames within the video. Accordingly, one scene may include distinctive image features from another scene within a video. For instance, one scene may comprise an indoor background with moving objects and another scene may comprise an outdoor background with relatively static objects.

Further, as used in this disclosure, a term sequence is a portion of text. In one or more embodiments, a term sequence includes a textual fragment, a phrase, or a sentence from a subtitle in a digital video file. As indicated above, a term sequence may be in a source language (e.g., English or German). The contextual translation system can determine a subset of frames corresponding to the term sequence.

Additionally, as used in this disclosure, an image feature includes an attribute or aspect of a digital image. For example, an image feature includes pixels representing objects in a video frame, a background of a video frame, or colors in a video frame. By contrast, an image feature may also include metadata corresponding to a video frame. Relatedly, a contextual feature includes a characteristic indicating context for a digital image, set of digital images, subset of digital images, and/or digital video file. A contextual feature reflects information about the context of a video frame, a set of video frames, or a subset of video frames.

As used in this disclosure, a contextual identifier includes a code, classifier, descriptor, numeric representation, or tag reflecting information about the context of a frame, set of frames, subset of frames, scene, or digital video file. For example, a contextual identifier can include a word or phrase indicating a contextual feature of a video frame or set of video frames from a digital video file. In some embodiments, a contextual identifier indicates information about the mood or tone of a scene, relationships between people or objects in a scene, activities occurring in the scene, a pace of movement or action in a scene, and/or a variety of other contextual information about a scene.

Further, a neural network can include a model of interconnected artificial neurons (organized in layers) that communicate and learn to approximate complex functions and generate outputs based on a plurality of inputs provided to the model. In addition, a neural network can include an algorithm (or set of algorithms) that implements deep learning techniques that utilize algorithms to model high-level abstractions in data. For example, a neural network can include a convolutional neural network, a recurrent neural network, and/or a graph neural network.

Relatedly, a contextual neural network include a neural network that generates contextual identifiers corresponding to images or video frames. For example, a contextual neural network includes a neural network that analyzes image features from an image or video frame (or a set of images or video frames) and generates contextual identifiers reflecting the image features. In some embodiments, a contextual neural network includes convolutional layers and LSTM layers.

By contrast, a translation neural network includes a neural network that generates a translation of a term sequence. In some embodiments, a translation neural network includes a neural network that analyzes features of a term sequence and one or more corresponding contextual identifiers to generate a translation of the term sequence. In some cases, a translation neural network further generates one or more affinity scores for a translation. In some embodiments, a translation neural network includes an encoder recurrent neural network and a decoder recurrent neural network.

Relatedly, a source language includes an initial or an original language in which a term, term sequence, or other communication was expressed. For example, the source language of this disclosure is English. The source language of a subtitle in a video of "Comment vas-tu?" is French. In some instances, the source language includes a particular dialect of the initial or the original language, such as French (France) or French (Québec). While this disclosure uses English as an example of a source language, the contextual translation system can generate contextual translations of texts in a variety of source languages. Conversely, a target language includes a language into which a term, term sequence, or other communication is translated or is intended to be translated. For example, when the contextual translation system translates a subtitle of "Comment vas-tu?" from French to English, the target language is English. As with the source language, in some instances, the target language includes a particular dialect of a language.

As further described in this disclosure, an affinity score includes a score indicating a degree to which two items are connected or related. For example, an affinity score includes a score indicating a connection or a relationship (i) between a contextual identifier and a translated term, a translated phrase, or other portion of a translation or (ii) between a contextual identifier and a candidate term for translation in a target language, a candidate phrase for translation in the target language, or other portion of text for translation in the target language. Relatedly, as used in this disclosure, an affinity array includes a collection of affinity scores. For example, an affinity array can include a matrix of affinity scores (i) for a particular translated term, translated phrase, or other portion of a translation or (ii) for a candidate term for translation in a target language, a candidate phrase for translation in the target language, or other portion of text for translation in the target language.

Turning now to FIG. 1, this figure depicts a block diagram illustrating an exemplary system 100. Specifically, FIG. 1 illustrates the system 100 including a client device 102, a client application 104, a network 106, server device(s) 108, a content management system 110, a contextual translation system 112, a video database 114, and third-party server(s) 116. Although FIG. 1 illustrates one client device, in alternative embodiments, the system 100 can include any number of client devices and corresponding users. Similarly, although FIG. 1 illustrates a particular arrangement of the client device 102, the network 106, the server device(s) 108, and the third-party server(s), various arrangements are possible.

As shown in FIG. 1, the client device 102 can include the client application 104. As discussed below with regard to FIG. 11, the client device 102 can include any of a variety of types of computing devices. In some embodiments, the client application 104 includes one or more software applications that allow a corresponding user to view, send, and/or receive digital content. For example, the client application 104 can be a software application installed on the client device 102 or a web-based application accessed via the server device(s) 108.

Figure 11:
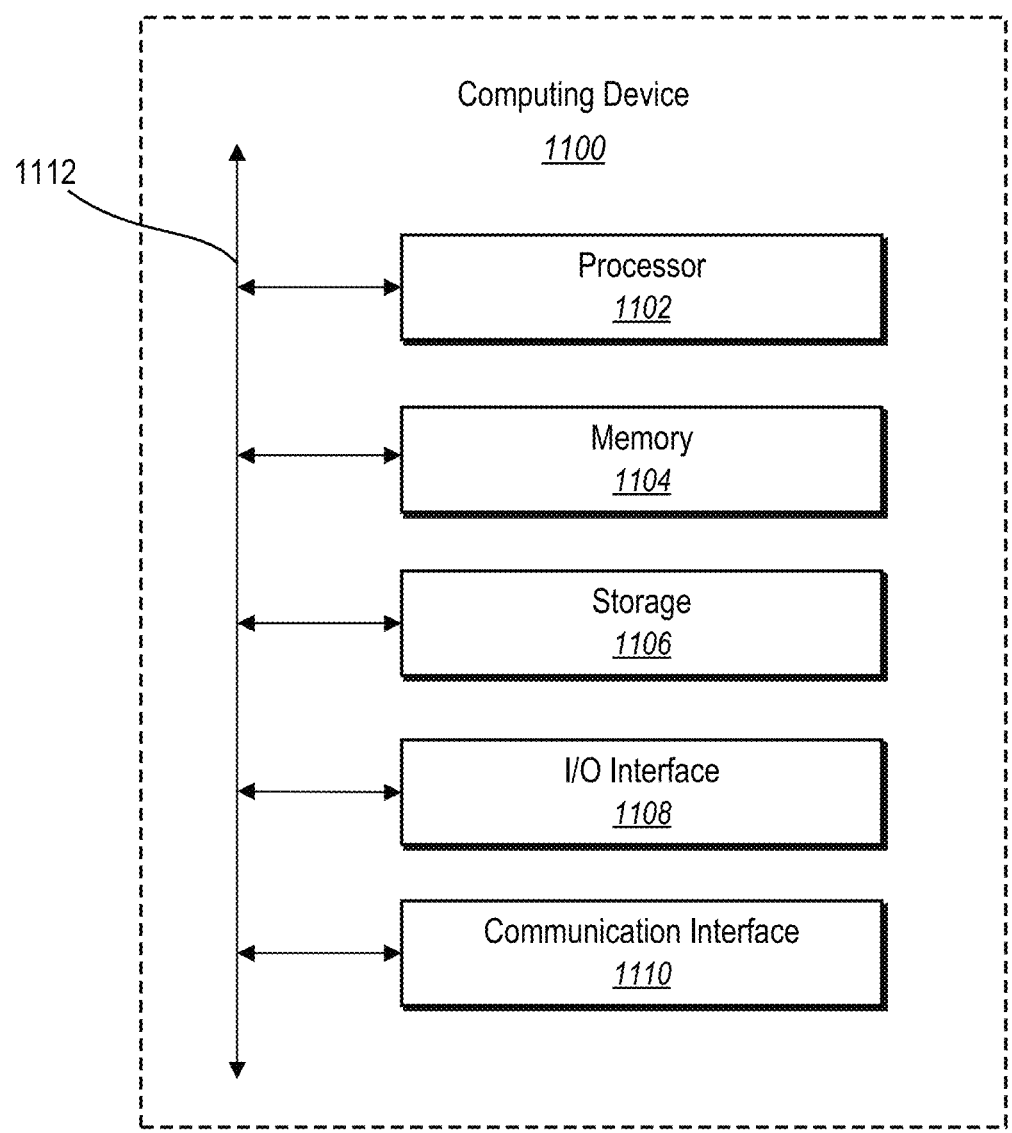
FIG. 11 illustrates a block diagram of an example computing device for implementing one or more embodiments of the present disclosure.

As further shown in FIG. 1, the client device 102, the server device(s) 108, and the third-party server(s) 116 may be communicatively coupled with each other directly or indirectly, such as coupling through the network 106, which is described further in relation to FIG. 11. The client device 102, the server device(s) 108, and the third-party server(s) 116 may include any kind of computing device, including one or more computing devices as discussed further below in relation to FIG. 11. In some embodiments, the server device(s) 108 or the third-party server(s) 116 each comprise a data server, a communication server, or a web-hosting server and can generate, store, receive, and/or transmit any type of data, including user inputs requesting a rendering of a video. In certain implementations, the client device 102 comprises a computing device that allows a corresponding user to send and receive digital communications.

Additionally, as shown in FIG. 1, the server device(s) 108 can include the content management system 110 and the contextual translation system 112. In general, the content management system 110 can facilitate the storage, rendering, and maintenance of various types of digital content. For example, the content management system 110 can manage digital video files. Among other things, in some implementations, the content management system can provide digital video files to the contextual translation system 112.

In addition to management of various digital content, the content management system 110 can include the contextual translation system 112. In some embodiments, the contextual translation system 112 receives a digital video file from the content management system 110. Upon receiving the digital video file, the contextual translation system 112 analyzes video frames and corresponding term sequences from the digital video file. Based on analyzing the video frames and corresponding term sequences, the contextual translation system 112 can utilize a contextual neural network and a translation neural network to generate translations for the term sequences. As suggested above, the contextual translation system 112 can further provide the translations as subtitles for a video within the digital video file.

As further illustrated in FIG. 1, the server device(s) 108 are communicatively coupled to the video database 114. In one or more embodiments, the server device(s) 108 access and query data from the video database 114 associated with requests from the content management system 110. For instance, the server device(s) 108 may access videos, frames, or scenes from videos for the content management system 110 and/or the contextual translation system 112. As shown in FIG. 1, the video database 114 is separately maintained from the server device(s) 108. Alternatively, in one or more embodiments, the server device(s) 108 and the video database 114 comprise a single combined system or subsystem within the server device(s) 108.

As suggested by previous embodiments, the contextual translation system 112 can be implemented in whole or in part by the individual elements of the system 100. Although FIG. 1 illustrates the contextual translation system 112 implemented within the server device(s) 108, components of the contextual translation system 112 can be implemented in other components of the system 100. For instance, in some embodiments, the client device 102 comprises the contextual translation system 112 and performs all of the functions, methods, and processes of the contextual translation system 112 described above and below.

Figure 2A:
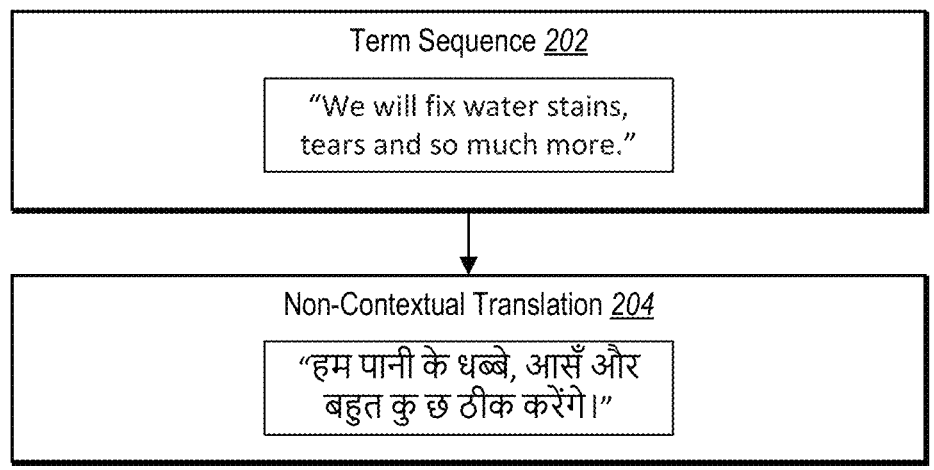
FIG. 2A illustrates a translation by a conventional machine-translation system.

As indicated above, in some embodiments, the contextual translation system 112 more accurately and flexibly translates texts corresponding to an image or video than conventional machine-translation systems. FIG. 2A illustrates a translation performed by one such conventional machine-translation system. As shown in FIG. 2A, a conventional machine translation applies a conventional model to inaccurately translate a term sequence 202 from a source language to a target language. Because conventional machine-translation system often focus solely on the text, such systems routinely mistranslate homonyms, idiomatic expressions, or slang in video subtitles and other texts. Even when a conventional machine-translation system analyzes text surrounding or near a source text, such a conventional system can fail to correctly translate a term or phrase.

In particular, FIG. 2A depicts the term sequence 202 in a source language as follows: "We will fix water stains, tears, and so much more." In FIG. 2A, the term sequence 202 is expressed in English as the source language and includes the term "tear." The term "tear" is a homonym that can mean a rip (e.g., in a piece of paper or fabric) or a teardrop (e.g., from a person crying), among other meanings. In the term sequence 202, the term "tear" refers to a rip and not a teardrop. Some conventional machine-translation systems cannot accurately identify the correct meaning of "tear" (or other homonyms) for purposes of translation. Indeed, many conventional machine-translation systems translate the term "tear" based on the most common usage or most common meaning of the term. For example, in some cases, a conventional machine-learning system automatically translates "tear" as meaning a teardrop, as that is the more common usage.

As further shown in FIG. 2A, the conventional machine-translation system generates a non-contextual translation 204 in a target language as follows: " हम पानी के धब्बे, आसँ और बहुत कु छ ठीक करेंगे। ." In FIG. 2A, the non-contextual translation 204 is expressed in Hindi as the target language and includes the term " आसँ " as a translation for the term "tear." But " आसँ " refers to a teardrop in Hindi. A Hindi speaker would find the term " आसँ " inaccurate and confusing in the non-contextual translation 204. Indeed, the non-contextual translation 204 suggests that "we" fix a user's teardrops. Conventional machine-translation systems frequently generate similarly confusing mistakes for idiomatic expressions, slang, or other tricky source texts.

Figure 2B:
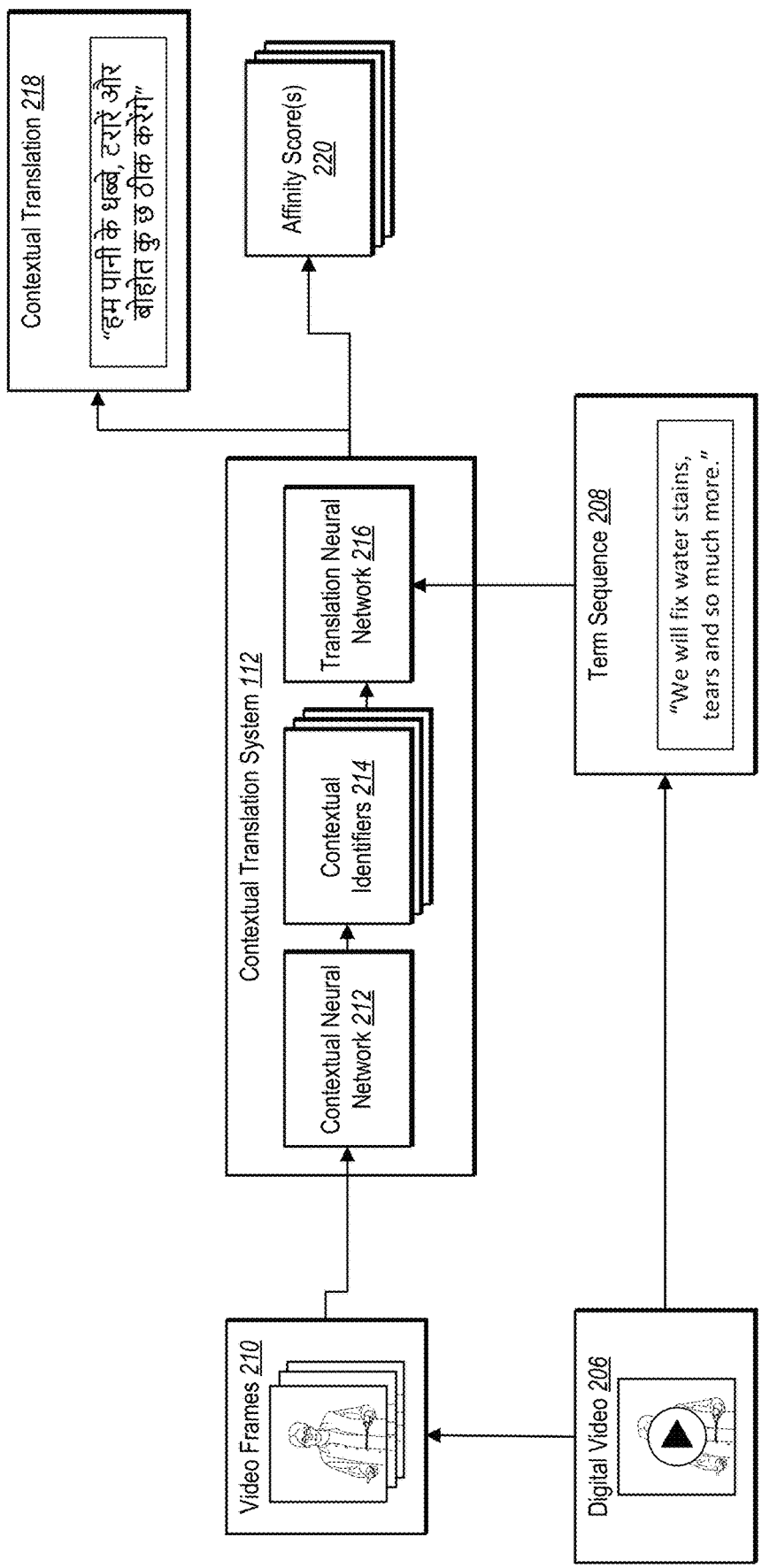
FIG. 2B illustrates an overview of the contextual translation system translating a text corresponding to video frames based on contextual identifiers in accordance with one or more embodiments.

In comparison to such conventional machine-translations, the contextual translation system 112 more accurately translates the same (or other) term sequences. In accordance with one or more embodiments, FIG. 2B depicts the contextual translation system 112 generating contextual identifiers indicating context for video frames and utilizing those contextual identifiers to translate text corresponding to such video frames. In particular, the contextual translation system 112 generates a contextual translation of a term sequence corresponding to frames from a digital video 206.

To generate such a contextual translation, the contextual translation system 112 identifies (i) video frames 210 corresponding to a scene in the digital video 206 and (ii) a term sequence 208 in a source language corresponding to the video frames 210. The contextual translation system 112 further utilizes a contextual neural network 212 to determine contextual identifiers 214 for the video frames 210 based on image features of the video frames 210. Based on the contextual identifiers 214, the contextual translation system 112 utilizes a translation neural network 216 to generate a contextual translation 218 of the term sequence 208. The translation neural network 216 further generates affinity score(s) 220 corresponding to the contextual identifiers 214.

As shown in FIG. 2B, for instance, the contextual translation system 112 identifies a plurality of video frames from the digital video 206. As discussed below, the contextual translation system 112 identifies scenes from the digital video 206 based on one or both of (i) image features from such a plurality of video frames and (ii) metadata associated with the plurality of video frames. By analyzing image features or metadata, the contextual translation system 112 identifies a set of frames corresponding to each scene from the digital video 206—including the video frames 210 corresponding to a particular scene. After identifying the video frames 210, the contextual translation system 112 inputs the video frames 210 into the contextual neural network 212.

Based on the video frames 210, the contextual neural network 212 generates the contextual identifiers 214. As suggested above, the contextual identifiers 214 reflect contextual features of the video frames 210. For example, the contextual identifiers 214 can reflect relationships between items or individuals, connotations surrounding items, or actions taken by (or on) objects. The contextual translation system 112 further provides the contextual identifiers 214 to the translation neural network 216 as an input.

As also shown in FIG. 2B, the contextual translation system 112 further identifies the term sequence 208 in a source language from the digital video 206. Such a term sequence can be a phrase, a sentence, or other portion of subtitles from the digital video 206. In some implementations, the contextual translation system 112 identifies the term sequence 208 in a source language from metadata associated with the digital video 206. By contrast, in certain embodiments, the contextual translation system 112 extracts the term sequence 208 in a source language from metadata associated with the digital video 206 (e.g., by applying optical character recognition (OCR)).

After identifying the term sequence 208, the contextual translation system 112 applies the translation neural network 216 to the contextual identifiers 214 and the term sequence 208. Based on the contextual identifiers 214 and the term sequence 208, the translation neural network 216 generates the contextual translation 218 in a target language and the affinity score(s) 220. Again, here, the target language is Hindi for purposes of comparison. As indicated above, in certain implementations, the affinity score(s) 220 reflect affinities between particular contextual identifiers and particular translated terms (or translated phrases) from the contextual translation 218. In some cases, the affinity score(s) 220 reflect affinities between particular contextual identifiers and the entirety of the contextual translation 218.

As depicted in FIG. 2B, the translation neural network 216 generates the following Hindi translation as the contextual translation 218 of the term sequence 208: " हम पानी के धब्बे, टरारें आसँ बोहोत कु छ ठीक करेंगे ." In contrast to the non-contextual translation 204 in FIG. 2A, the contextual translation 218 in FIG. 2B includes the term "दरारें" as the translation for the term "tear." The term "दरारें" means a rip. Based on the contextual identifiers 214, the contextual translation system 112 correctly translates the term "tear" from English to the term "दरारें" in Hindi. By utilizing the contextual identifiers 214, the translation neural network 216 accordingly generates a more accurate translation than conventional machine-translation systems.

As discussed above, the contextual translation system 112 identifies sets of frames corresponding to scenes in a digital video file. In accordance with one or more embodiments, FIG. 3 depicts the contextual translation system 112 identifying sets of frames corresponding to scenes 302a-302i within a digital video file 300 and (optionally) detecting reference frames corresponding to scenes within the digital video file 300.

Figure 3:
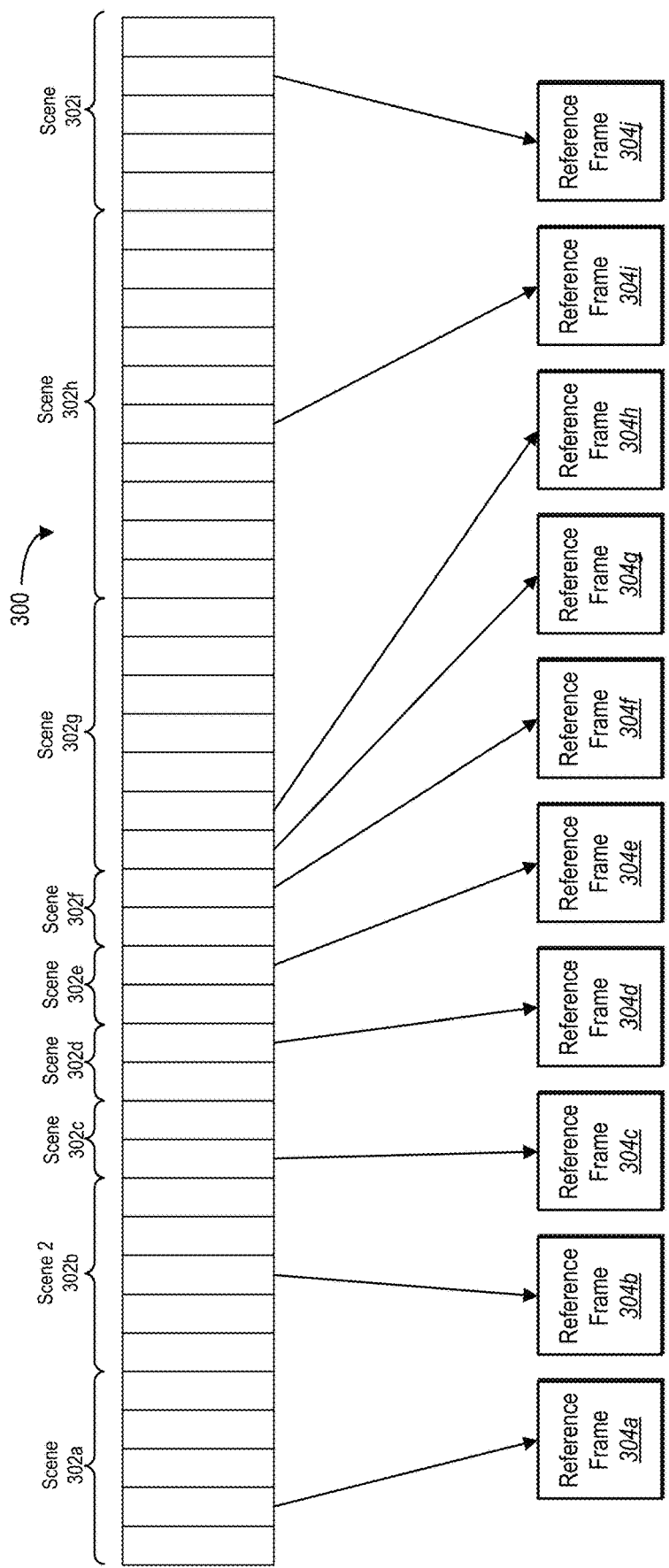
FIG. 3 illustrates a schematic diagram of a process in which the contextual translation system identifies scenes from a video in accordance with one or more embodiments.

For illustrative purposes, FIG. 3 includes an example number of frames in a plurality of frames corresponding to the digital video file 300 and example numbers of sets of frames corresponding to each of the scenes 302a-302i that fit within space restrictions. In a real-world example, each of the scenes 302a-302i for the digital video file 300 may include more frames within each respective set of frames.

As indicated above, the contextual translation system 112 can identify sets of frames corresponding to the scenes 302a-302i within the digital video file 300 based on (i) metadata within the digital video file 300 or within video-data packets or (ii) similarity of image features between (or among) contiguous frames from the video. For example, in certain implementations, the contextual translation system 112 identifies scene tags from the metadata of the digital video file 300 or within video data packets identifying one (or both) of an individual frame and an ending frame for each of the scenes 302a-302i. Additionally, or alternatively, the contextual translation system 112 identifies a set of frames corresponding to each of the scenes 302a-302i based on comparing image features within each frame to image features within a set of contiguous frames and identifying one (or both) of an initial frame and an editing frame for a scene comprising image features distinguishable from the contiguous frames with reference to a matching threshold.

In some embodiments, the contextual translation system 112 identifies a set of frames corresponding to each of the scenes 302a-302i based on image features—as follows. The contextual translation system 112 detects image features within a set of frames corresponding to the digital video file 300. The contextual translation system 112 detects image features within a set of frames corresponding to the digital video file 300. The contextual translation system 112 further selects a frame and compares (i) a subset of image features from the selected frame to (ii) a subset of image features from each frame of a contiguous set of frames in proximity to the selected frame. Such a contiguous set of frames may be within a threshold number of frames from the selected frame (e.g. within 16 or 20 frames from the selected frame).

The contextual translation system 112 further determines whether the subset of image features from the selected frame satisfies a contiguous set of frames. Such a matching threshold may be a minimum percentage of matching image features (e.g. less than or equal to 50% or 60% matching image features). When the selected frame does not satisfy the matching threshold in comparison to the contiguous set of frames, the contextual translation system 112 identifies the selected frame as an initial frame for a set of frames corresponding to the scene. By identifying initial frames corresponding to different scenes, the contextual translation system 112 can identify an initial frame and an ending frame for a set of frames corresponding to each of the scenes 302a-302i.

To identify image features within the frames of the digital video file 300, in some embodiments, the contextual translation system 112 resizes each frame to a smaller size (e.g. 256 pixels in length or 512 pixels in length). The contextual translation system 112 further applies a feature-detection algorithm to detect a subset of feature points within each resized frame. For example, the contextual translation system 112 can apply a Feature from Accelerated Segment Test (FAST) detection algorithm, a Binary Robust Independent Elementary Features (BRIEF) detection algorithm, or an Oriented FAST and rotated BREIF (ORB) detection algorithm, as described by Ethan Rublee et al., "ORB: an efficient alternative to SIFT or SURF," *Proceedings of the IEEE International Conference on Computer Vision* (2011), the entire contents of which are hereby incorporated by reference. By applying the FAST, BRIEF, or ORB detection algorithm, the contextual translation system 112 can detect a subset of feature points within each resized frame. In certain implementations, the contextual translation system 112 applies the FAST detection algorithm to identify key points within a frame and a Harris-Corner-Detection algorithm to find the top N feature points from among the key points of each resized frame. The contextual translation system 112 further uses a pyramid algorithm to identify multiscale-features from each resized frame (e.g., Gaussian pyramid, Laplacian pyramid, or Steerable pyramid).

Alternatively, the contextual translation system 112 may use any suitable feature-detection algorithm to detect feature points within frames, including, but not limited to, a Laplacian of Gaussian algorithm, a Principal Curvature-Based Region (PCBR) algorithm, a Scale-Invariant Feature Transform (SIFT) algorithm, a Speed up Robust Feature (SURF) algorithm, or a Smallest Univalue Segment Assimilating Nucleus (SUSAN) algorithm.

To identify an initial frame (and a corresponding ending frame) for each set of frames corresponding to a scene ($S_i$), in some embodiments, the contextual translation system 112 identifies and tallies a number of feature points (i) detected from the feature-detection algorithm and (ii) shared in common between a selected frame and another frame within a threshold distance of the selected frame. For example, the contextual translation system 112 can identify and tally a number of feature points between a selected frame ($F_s$) and a previous frame ($F_p$). When the number of matching feature points between the selected frame ($F_s$) and the previous frame ($F_p$) are equal to (or less than) a matching threshold of feature points, the contextual translation system 112 temporarily identifies the selected frame ($F_s$) as an initial frame for a start of a scene ($S_i$).

Continuing the example from the previous paragraph, the contextual translation system 112 further identifies and tallies a number of feature points between the selected frame ($F_s$) and a contiguous frame ($F_c$) from frames within a threshold number of frames (K) from the selected frame ($F_s$), such as a threshold of 16, 20, or 30 frames. When the number of matching feature points between the selected frame ($F_s$) and each contiguous frame ($F_p$) from a set of contiguous frames are equal to (or less than) a matching threshold of feature points, the contextual translation system 112 identifies (or confirms) the selected frame ($F_s$) as an initial frame for a start of a scene ($S_i$). By identifying an initial frame corresponding to each scene ($S_i$), the contextual translation system 112 can identify an initial frame ($F_i$) and an ending frame ($F_e$) for a set of frames corresponding to each scene ($S_i$), where $S_i = F_i \to F_e$.

After identifying a set of frames for each of the scenes 302a-302i from the digital video file 300, in some embodiments, the contextual translation system 112 selects one or more reference frames for each scene. As shown in FIG. 3, for instance, the contextual translation system 112 selects the reference frames 304a-304j for the scenes 302a-302i, where the scene 302g corresponds to the reference frames 304g and 304h. As indicated above, the contextual translation system 112 can identify one or more reference frames for each of the scenes 302a-302i from the digital video file 300 based on (i) metadata within a video file or within video-data packets or (ii) feature-matching scores from frames within each set of frames. For example, in certain implementations, the contextual translation system 112 identifies reference-frame tags within the metadata of a video file or within video-data packets identifying one or more reference frames for each of the scenes 302a-302i. Alternatively, the contextual translation system 112 generates a feature-matching score each frame from a set of frames by determining a mean number of matching image features for the frame in common with each other frame within the set of frames corresponding to a scene.

In some implementations, for instance, the contextual translation system 112 scans through each set of frames for a scene ($S_i$). The contextual translation system 112 further determines a number of feature points that a given frame ($F_g$) has in common with each other frame ($F_o$) within the set of frames for a scene ($S_i$). The contextual translation system 112 subsequently determines a mean number of feature points—or a mean-feature-matching score (FMS)—that the given frame ($F_g$) matches (or has in common) with each other frame ($F_o$) within the set of frames, where FMS ($F_g$)=1/N and represents a sum of image features within the given frame ($F_g$) matching other frames ($F_o$) within a set of frames for a scene ($S_i$). The contextual translation system 112 can store such a mean-feature-matching score (FMS) for the given frame ($F_g$) within a memory of a database, client device, server, or other computing device. The contextual translation system 112 subsequently selects a frame from the set of frames for each scene ($S_i$) as a reference frame. For example, the contextual translation system 112 may select, as a reference frame, a frame corresponding to a highest mean-feature-matching score from among a set of frames for a scene for each scene ($S_i$).

As indicated above, in some cases, the contextual translation system 112 selects multiple reference frames for a scene. In FIG. 3, for instance, the contextual translation system 112 selects the reference frames 304g and 304h for the scene 302g. The contextual translation system 112 may select multiple reference frames for such a scene based on (i) identifying multiple reference-frame tags for a scene within metadata or (ii) identifying multiple sets of frames corresponding to a single scene based on image features. In some embodiments, for instance, the contextual translation system 112 identifies multiple frames corresponding to a single scene, where the multiple frames each comprise image features that are equal to (or less than) a matching threshold of image features. In some such instances, the contextual translation system 112 identifies different sets of frames corresponding to a single scene and accordingly selects a reference frame corresponding to each set of frames for the single scene.

Figure 4A:
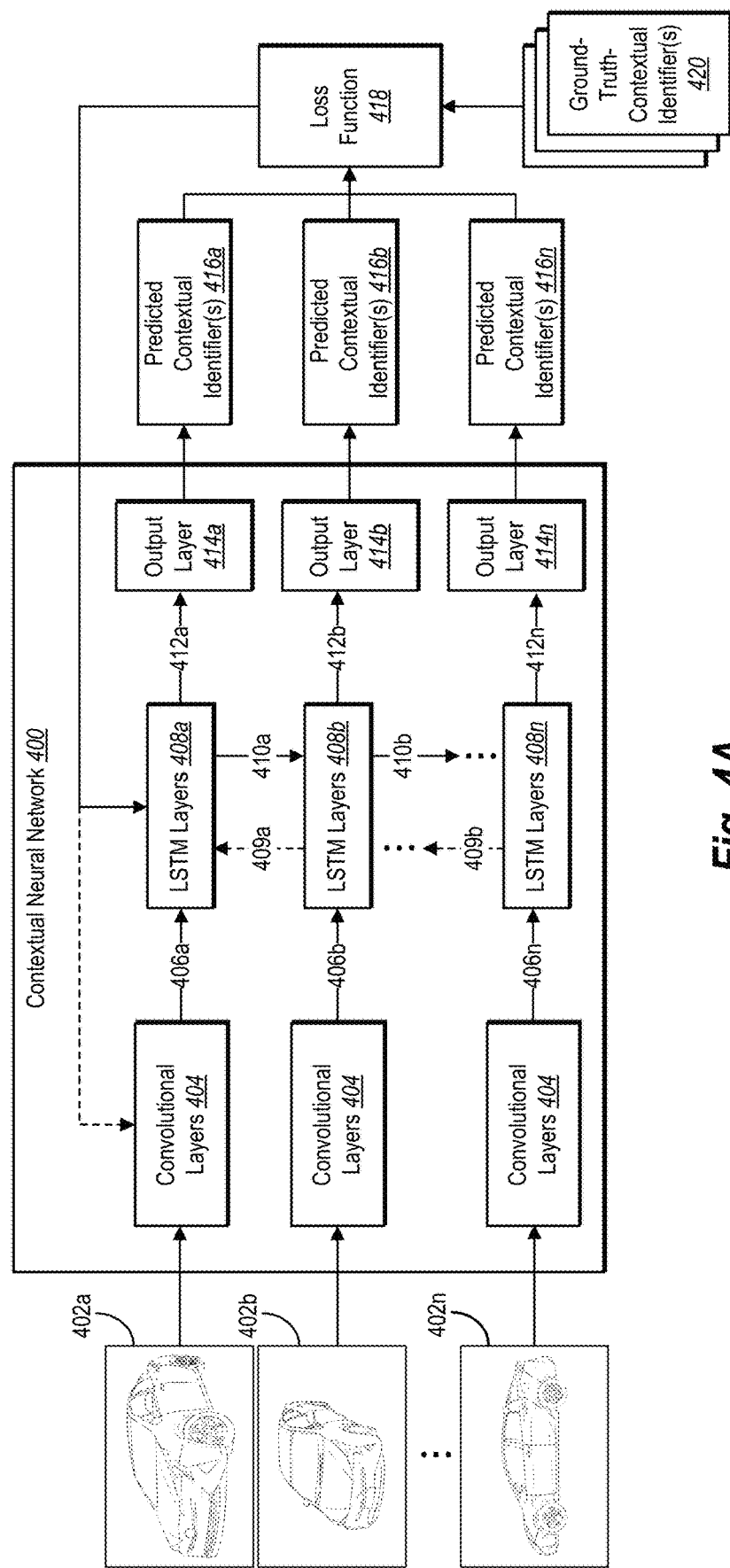
FIG. 4A illustrates a process for training a contextual neural network in accordance with one or more embodiments.

As noted above, in certain implementations, the contextual translation system 112 trains a contextual neural network to generate contextual identifiers. FIG. 4A illustrates an example of the contextual translation system 112 training the contextual neural network in accordance with one or more embodiments. As shown in FIG. 4A, for instance, the contextual translation system 112 generates predicted contextual identifier(s) 416a-416n corresponding to training frames 402a-402n utilizing a contextual neural network 400.

More specifically, the contextual neural network 400 uses convolutional layers 404 to generate training frame vectors 406a-406n based on the training frames 402a-402n. The contextual neural network 400 further uses LSTM layers 408a-408n to generate output states 409a-409b (and optionally output states 410a-410b) as well as generate predicted intermediate vectors 412a-412n. Upon receiving the predicted intermediate vectors 412a-412n, the output layers 414a-414n generate the predicted contextual identifier(s) 416a-416n. To clarify that FIG. 4A depicts training the contextual neural network 400, this disclosure refers to images and contextual identifiers as respectively training frames and predicted contextual identifiers. In some embodiments, the contextual neural network uses convolutional layers and LSTM layers as described by Jeff Donahue et al., "Long-Term Recurrent Convolutional Networks for Visual Recognition and Description," *Proceedings of the IEEE Conf. on Computer Vision and Pattern Recognition* (2015), the entire contents of which are incorporated by reference.

As depicted in FIG. 4A, the contextual translation system 112 applies the contextual neural network 400 to the training frames 402a-402n. In one or more embodiments, the training frames 402a-402n are digital images cropped to a uniform size. Accordingly, the cropped digital images can simulate video frames from a digital video file. In the alternative, in some embodiments, the training frames 402a-402n constitute training frames from a training digital video. As part of the training of the contextual neural network 400, in some embodiments, the contextual translation system 112 provides the training frames 402a-402n to the convolutional layers 404.

As shown in FIG. 4A, the convolutional layers 404 are part of the contextual neural network 400. In some embodiments, the convolutional layers 404 are a convolutional neural network or a portion of a convolutional neural network. In some embodiments, the convolutional layers 404 are pre-trained on a categorization task before training the contextual neural network 400. Further, in one or more embodiments, the contextual translation system 112 can utilize transfer learning from a pre-trained version of the convolutional layers 404 to inform training of the contextual neural network 400. More specifically, the contextual translation system 112 can derive a transfer learning toolkit from the convolutional layers 404 and utilize that transfer learning toolkit to inform training of the LSTM layers 408a-408n and/or retraining the convolutional layers 404.

In an initial iteration, for instance, the contextual translation system 112 inputs the training frame 402a into the contextual neural network 400. The convolutional layers 404 generate the training frame vector 406a based on the training frame 402a and provide the training frame vector 406a to the LSTM layers 408a. In addition to receiving the training frame vector 406a, the LSTM layers 408a may receive an output state 409a from the LSTM layers 408b—adjacent to the LSTM layers 408a. The LSTM layers 408a pass data from the training frame vector 406a (and in some embodiments the output state 409a) through one or more gates to determine an extent with which to process the received data.

Accordingly, the LSTM layers 408a can generate the predicted intermediate vector 412a based on output states from adjacent LSTM layers. The LSTM layers 408a generate the predicted intermediate vector 412a based on the training frame vector 406a and provide the predicted intermediate vector 412a to the output layer 414a. In some cases, the LSTM layers 408a utilizes memory states and other input in conjunction with a variety of gates to generate one or more predicted intermediate vectors as output. In turn, the output layers 414a generate the predicted contextual identifier(s) 416a. In one or more embodiments, the output layers 414a concatenate or otherwise combine multiple vectors from the LSTM layers 408a-408n to generate the predicted contextual identifier(s) 416a.

As further shown in FIG. 4A, upon receiving the training frames 402b-402n, the convolutional layers 404 generate the training frame vector 406b-406n and provide the training frame vectors 406b-406n to the LSTM layers 408b-408n. The LSTM layers 408b-408n further receive the training frame vectors 406a-406n and the output states 409b and 410a-410b from adjacent layers within the LSTM layers 408a-408n. The LSTM layers 408b-408n pass data from the training frame vectors 406b-406n and the output states 409b and 410a-410b through one or more gates to determine an extent with which to process the received data.

Accordingly, the LSTM layers 408b-408n can generate the predicted contextual identifier(s) 416b-416n based on bidirectional output states. The LSTM layers 408b-408n generate and provide the predicted intermediate vectors 412b-412n to the output layers 414a-414n. For example, the LSTM layers 408b-408n utilize memory states and other input in conjunction with a variety of gates to generate one or more vectors as output. In turn, the output layers 414b-414n generate the predicted contextual identifier(s) 416a-416n. In one or more embodiments, the output layers 414a-414n combine (e.g. via averaging or concatenation) multiple vectors from the LSTM layers 408a-408n to generate the predicted contextual identifier(s) 416b-416n.

As mentioned, the LSTM layers 408a-408b can receive output states 409a-409b and 410a-410b from adjacent layers within the LSTM layers 408a-408n. The output states 409a-409b and 410a-410b include memory states from adjacent LSTM layers. In some embodiments, the contextual translation system 112 applies LSTM layers 408a-408n as unidirectional LSTM layers. When implemented as unidirectional, the LSTM layers 408a-408b provide the output states 410a-410b to the LSTM layers 408b-408n "below" them, and the LSTM layers 408b-408n receive the output states 410a-410b from the LSTM layers 408a-408b "above" them. In other embodiments, the contextual translation system 112 applies the LSTM layers 408a-408n as bidirectional LSTM layers as depicted in FIG. 4A.

In addition to generating the predicted contextual identifier(s) 416a-416n, the contextual translation system 112 compares the predicted contextual identifier(s) 416a-416n to ground-truth-contextual identifier(s) 420. As shown in FIG. 4A, the ground-truth-contextual identifier(s) 420 respectively correspond to the training frames 402a-402n. The ground-truth-contextual identifier(s) 420 further include a ground-truth-contextual identifier with which to compare each of the predicted contextual identifier(s) 416a-416n. In some embodiments, the contextual translation system 112 utilizes a loss function 418 to determine a loss based on a comparison of the predicted contextual identifier(s) 416a-416n to the ground-truth-contextual identifier(s) 420. In some cases, the contextual translation system 112 uses a cross-entropy function as the loss function 418 (e.g., a binary cross-entropy function). Alternatively, in certain implementations, the contextual translation system 112 uses a least-squared-error function, a means-squared-error function, or other suitable loss functions as the loss function 418.

Upon determining a loss from the loss function 418, the contextual translation system 112 modifies internal parameters (e.g. weights or values) of the LSTM layers 408a-408n to decrease a loss for the loss function 418 in a subsequent training iteration using back propagation—as indicated by the arrow from the loss function 418 to the LSTM layers 408a-408n. Additionally, in one or more embodiments, the contextual translation system 112 optionally modifies internal parameters of the convolutional layers 404, as indicated by the dotted arrow from the loss function 418 to the convolutional layers 404. The contextual translation system 112 may increase or decrease weights or values from some (or all) of the parts of the contextual neural network 400 to decrease or minimize a loss in a subsequent training iteration.

As suggested above, FIG. 4A illustrates an initial training iteration of the contextual translation system 112 training the contextual neural network 400. In a subsequent training iteration, the contextual translation system 112 likewise generates additional predicted contextual identifier(s) corresponding to additional training frames. The contextual translation system 112 further applies the convolutional layers 404 and the LSTM layers 408a-408n to determine the additional predicted contextual identifier(s).

By iteratively determining losses from a comparison of predicted contextual identifiers and a ground-truth-contextual identifiers, the contextual translation system 112 trains the contextual neural network 400 to determine contextual identifiers from video frames. In some cases, the contextual translation system 112 performs training iterations until the value or weights of the contextual neural network 400 do not change significantly across training iterations or otherwise satisfy a convergence criteria. Accordingly, the contextual translation system 112 can train the contextual neural network 400 to generate contextual identifiers from frames corresponding to a digital video file.

While FIG. 4A depicts a contextual neural network including convolutional layers and unidirectional or bidirectional LSTM layers, in some embodiments, the contextual translation system 112 uses a different architecture for a contextual neural network. For example, the contextual translation system 112 may use a recurrent neural network or a convolutional neural network as the underlying network for a contextual neural network.

In addition to training the contextual neural network 400, in some embodiments, the contextual translation system 112 applies the contextual neural network 400 to generate contextual identifiers based on video frames. In accordance with one or more embodiments, FIG. 4B illustrates the contextual translation system 112 applying the contextual neural network 400 to generate contextual identifier(s) 428a-428n based on frames 422a-422n.

Figure 4B:
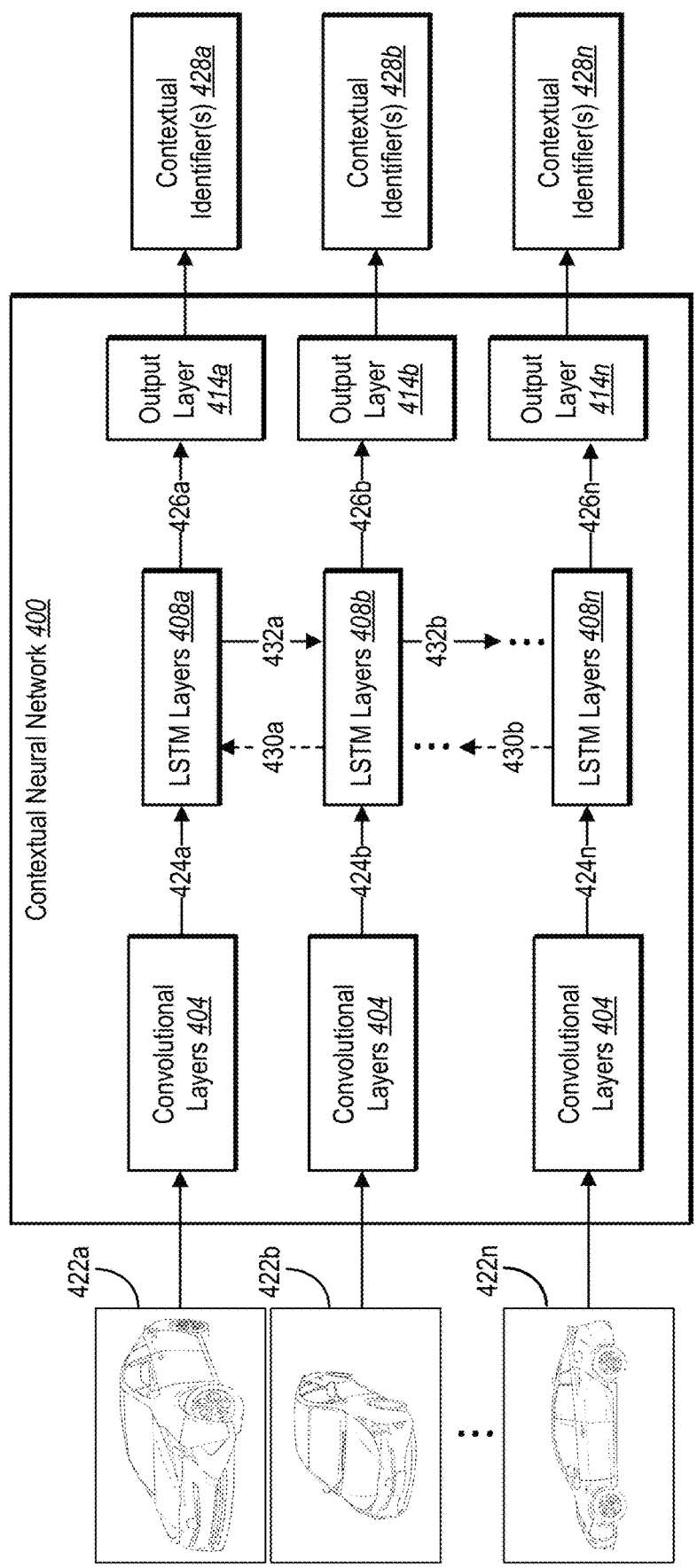
FIG. 4B illustrates a process for utilizing a contextual neural network to generate contextual identifiers in accordance with one or more embodiments.

As shown in FIG. 4B, the contextual translation system 112 inputs the frames 422a-422n into the convolutional layers 404. In some embodiments, the frames 422a-422n constitute frames from a digital video file. For example, the frames 422a-422n together constitute a set of frames corresponding to a scene, as described with respect to FIG. 3. The frames 422a-422b can be from a digital file of a variety of types, including a .wmv file, a .flv file, an .ogv file, an .avi file, a .mov file, and/or a variety of other video file types.

Based on the frames 422a-422n, the contextual neural network 400 generates the contextual identifier(s) 428a-428n. In an initial iteration, for example, the contextual translation system 112 inputs the frame 422a into the convolutional layers 404. Based on the frame 422a, the convolutional layers 404 generate the frame vector 424a and provide the frame vector 424a to the LSTM layers 408a. In one or more embodiments, the LSTM layers 408a also receive an output state 430a from the LSTM layers 408b. Based on the frame vector 424a and the output state 430a, the LSTM layers 408a generate an intermediate vector 426a (e.g., by passing the received data through various gates). The LSTM layers 408a subsequently provide the intermediate vector 426a to the output layer 414a. Based on the intermediate vector 426a, the output layer 414a generates the contextual identifier(s) 428a.

As discussed above, the contextual identifier(s) 428a indicate contextual features of the frame 422a. For instance, the contextual identifier(s) 428a indicate information about the context of the scene, including terms reflecting the nature of the scene, relationships between objects or individuals in the scene, or actions taking place in the scene. As shown in FIG. 4B, for instance, the frame 422a includes a car. Rather than generating an identifier of "car," the contextual neural network 400 generates the contextual identifier(s) 428a indicating more complex concepts, such as "chase sequence," "transportation," or "turning." As described above and below, the contextual identifier(s) 428a accordingly provide additional context for the contextual translation system 112 to generate contextual translations.

As depicted in FIG. 4B, the contextual translation system 112 applies the contextual neural network 400 to generate the contextual identifier(s) 428b-428n. For example, the contextual translation system 112 inputs the frame 422b into the convolutional layers 404. Based on the frame 422b, the convolutional layers 404 generate the frame vector 424b and provide the frame vector 424b to the LSTM layers 408b. In one or more embodiments, the LSTM layers 408b also receive an output state 430b from the LSTM layers 408n and an output state 432a from the LSTM layers 408a. Based on the frame vector 424b, the output state 432a, and the output state 430b, the LSTM layers 408b generate an intermediate vector 426b (e.g., by passing the received data through various gates). The LSTM layers 408b subsequently provide the intermediate vector 426b to the output layer 414b. Based on the intermediate vector 426b, the output layer 414b generates the contextual identifier(s) 428b.

The contextual translation system 112 similarly generates the contextual identifier(s) 428n. Based on the frame 422n, the contextual neural network 400 similarly applies the convolutional layers 404 to generate a frame vector 424n. Based on the frame vector 424n and an output state 432b from the LSTM layers 408b, the LSTM layers 408n generate an intermediate vector 426n. Based on the intermediate vector 426n, the output layer 414n generates the contextual identifier(s) 428n. Upon generating the contextual identifier(s) 428a-428b, the contextual translation system 112 can use the contextual identifier(s) 428a-428b for translating a term sequence corresponding to the scene including the frames 422a-422n.

As depicted in FIG. 4B, the contextual neural network 400 includes convolutional layers and unidirectional or bidirectional LSTM layers. In some embodiments, the contextual translation system 112 uses a different architecture for a contextual neural network, including those described above. In the alternative to inputting a set of frames into a contextual neural network, in some embodiments, the contextual translation system 112 can input (and generate contextual identifiers based on) one or more reference frames corresponding to a scene. By selecting a reference frame for a scene as described above, the contextual translation system 112 can optionally reduce inputs into the contextual neural network to generate contextual identifiers corresponding to a scene.

Figure 5A:
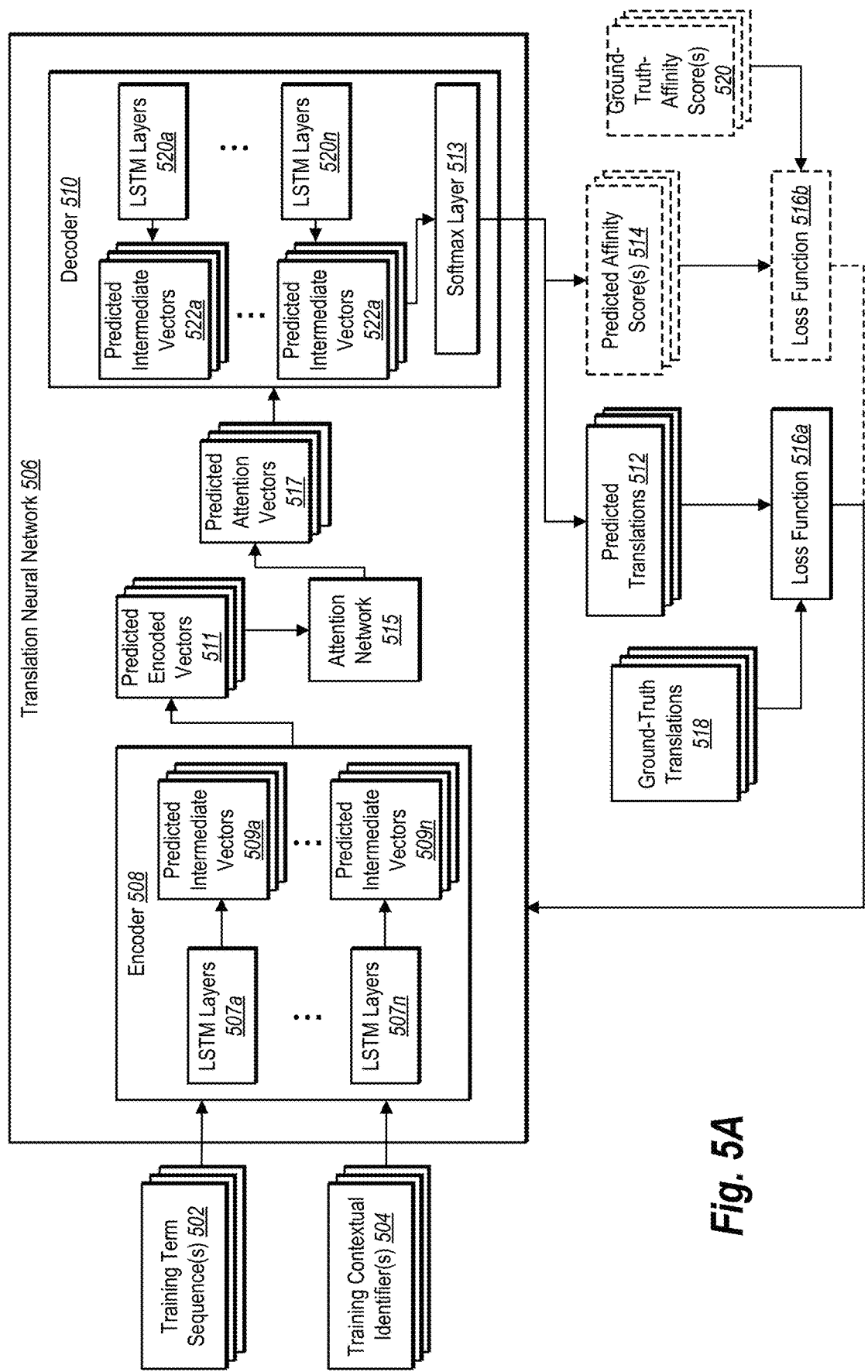
FIG. 5A illustrates a process for training a translation neural network in accordance with one or more embodiments.

As mentioned above, the contextual translation system 112 utilizes a translation neural network to generate contextual translations for term sequences. In accordance with one or more embodiments, FIG. 5A illustrates the contextual translation system 112 training a translation neural network 506. As shown in FIG. 5A, the translation neural network 506 comprises an encoder 508 and a decoder 510. In some cases, the encoder 508 constitutes an encoder recurrent neural network, and the decoder 510 constitutes a decoder recurrent neural network. For instance, such an encoder recurrent neural network and a decoder recurrent neural network may be part of a sequence-to-sequence neural network, as described by Yonghi Wu et al., "Google's Neural Machine Translation System: Bridging the Gap between Human and Machine Translation," arXiv: 1609.08144 (2016), the entire contents of which are incorporated by reference.

In a sequence of training iterations, the contextual translation system 112 provides the training term sequence(s) 502 and the training contextual identifier(s) 504 to the translation neural network 506. Based on the training term sequence(s) 502 and the training contextual identifier(s) 504, the encoder 508 utilizes LSTM layers 507a-507n to generate predicted intermediate vectors 509a-509n. The contextual translation system 112 combines (e.g., concatenates) the predicted intermediate vectors 509a-509n to generate the predicted encoded vectors 511. Based on the predicted encoded vectors 511, the attention network 515 generates the predicted attention vectors 517 and provides the predicted attention vectors 517 to the decoder 510.

Based on the predicted attention vectors 517, the decoder 510 utilizes LSTM layers 520a-520n to generate predicted intermediate vectors 522a-522n. Based on the predicted intermediate vectors 522a-522n, the decoder 510 uses a softmax layer 513 to generate predicted translations 512. In one or more embodiments, the decoder 510 also outputs predicted affinity score(s) 514 corresponding to the predicted translations 512. Based on a comparison of the predicted translations 512 to ground-truth translations 518— and optionally a comparison of the predicted affinity score(s) 514 to ground-truth-affinity score(s) 520—the contextual translation system 112 modifies internal parameters of the translation neural network 506.

As shown in FIG. 5A, the contextual translation system 112 utilizes training term sequence(s) 502 to train the translation neural network 506. The training term sequence(s) 502 can be any term sequences with known translations, such as the ground-truth translations 518. In one or more embodiments, the contextual translation system 112 utilizes textual fragments, phrases, or sentences as the training term sequence(s) 502. Accordingly, the contextual translation system 112 can train the translation neural network 506 to generate contextual translations of textual fragments, phrases, or sentences.

As further illustrated in FIG. 5A, the contextual translation system 112 utilizes training contextual identifier(s) 504 associated with the training term sequences. In one or more embodiments, the contextual translation system 112 utilizes the contextual neural network 400 to generate the training contextual identifier(s) 504 for video frames corresponding to the training term sequence(s) 502. Accordingly, the contextual translation system 112 can generate a large volume of training contextual identifier(s) 504 to train the translation neural network 506. Additionally, in one or more embodiments, the contextual neural network 400 initiates weights for the training contextual identifier(s) 504.

As noted above, the contextual translation system 112 can train the translation neural network 506 in multiple training iterations. In an initiation training iteration, for example, the contextual translation system 112 provides a training term sequence from the training term sequence(s) 502 and training contextual identifiers from the training contextual identifier(s) 504 to the encoder 508. In some embodiments, the contextual translation system 112 generates text vectors for each of the training term sequence and the training contextual identifiers and provides each of the text vectors to the encoder 508. As shown in FIG. 5A, the contextual translation system 112 can generate a text vector corresponding to each of the training term sequence(s) 502 and each of the training contextual identifier(s) 504 and can provide these text vectors to the encoder 508 independently. In the alternative, the contextual translation system 112 can generate a single text vector representing a training term sequence and a corresponding contextual identifier.

The contextual translation system 112 can utilize a variety of algorithms to generate such text vectors. For example, the contextual translation system 112 can utilize a word2vec algorithm, a GloVe algorithm, or another suitable algorithm. In the alternative, in some embodiments, the contextual translation system 112 utilizes an embedding layer trained based on a word2vec algorithm and/or a GloVe algorithm.

Continuing the initial iteration, the contextual translation system 112 provides the text vectors corresponding to the training term sequence and the training contextual identifiers to the encoder 508. Based on the text vectors, in one or more embodiments, the LSTM layers 507a-507n output predicted intermediate vectors. In some embodiments, the encoder 508 generates such predicted intermediate vectors of the predicted intermediate vectors 509a-509n via one or more output layers. As suggested above, the LSTM layers 507a-507n can be unidirectional or bidirectional. Additionally, in one or more embodiments, some layers of the LSTM layers 507a-507n can be bidirectional while other layers of the LSTM layers 507a-507n can be unidirectional (e.g., a bidirectional bottom LSTM layer and unidirectional LSTM layers for the remaining LSTM layers).

Based on the predicted intermediate vectors, the encoder 508 generates a predicted encoded vector. In one or more embodiments, the encoder 508 applies a max-pooling operation to the predicted intermediate vectors to generate the predicted encoded vector. Additionally, or alternatively, the encoder 508 concatenates or otherwise combines the predicted intermediate vectors to generate the predicted encoded vector. Upon receiving the predicted encoded vector from the encoder 508, the attention network 515 generates a predicted attention vector. In some embodiments, the contextual translation system 112 inputs the predicted attention vector into one or more of the LSTM layers 520a-520n. As suggested above, the LSTM layers 520a-520n can be unidirectional or bidirectional. Additionally, in one or more embodiments, some layers of the LSTM layers 520a-520n can be bidirectional while other layers of the LSTM layers 520a-520n can be unidirectional (e.g., a bidirectional bottom LSTM layer and unidirectional LSTM layers for the remaining LSTM layers).

Continuing the initial iteration, upon receiving the predicted attention vector, the decoder 510 uses the LSTM layers 520a-520n to generate predicted intermediate vectors. In some cases, the decoder 510 concatenates or otherwise combines the predicted intermediate vectors before providing the predicted intermediate vectors to the softmax layer 513. Upon receiving the predicted intermediate vectors, the softmax layer 513 generates a predicted translation of the corresponding training term sequence. In some embodiments, the softmax layer 513 further generates predicted affinity score(s) for the predicted translation and the corresponding training contextual identifiers.

As further shown in FIG. 5A, the contextual translation system 112 compares the predicted translation for an initial iteration to a ground-truth translation to determine a loss. For example, the contextual translation system 112 utilizes the loss function 516a to determine a loss based on a comparison of the predicted translation and a ground-truth translation. In some cases, the contextual translation system 112 uses a cross-entropy loss as the loss function 516a. But the contextual translation system 112 may use any suitable loss function as the loss function 516a (e.g., means-squared error).

In addition to determining a loss based on a comparison of a predicted translation and a ground-truth translation, in some embodiments, the contextual translation system compares the predicted affinity scores for the initial iteration to ground-truth-affinity scores to determine a loss. For example, the contextual translation system 112 utilizes the loss function 516b to determine a loss based on a comparison of the predicted affinity scores and the ground-truth-affinity scores. In some cases, the contextual translation system 112 uses a mean-squared-error function as the loss function 516b. But the contextual translation system 112 may use any suitable loss function as the loss function 516b.

Upon determining a loss from one or both of the loss functions 516a and 516b, the contextual translation system 112 modifies internal parameters (e.g. weights or values) of the translation neural network 506. For example, the contextual translation system 112 modifies internal parameters of the encoder 508 and the decoder 510. The contextual translation system 112 modifies these internal parameters to decrease a loss for one or both of the loss functions 516a and 516b in a subsequent training iteration using back propagation—as indicated by the arrow from the loss functions 516a and 516b to the translation neural network 506. The contextual translation system 112 may increase or decrease weights or values from some (or all) of the parts of the translation neural network 506 to decrease or minimize a loss in a subsequent training iteration.

As indicated above, in some embodiments, the contextual translation system 112 iteratively determines losses from comparisons of predicted translations to ground-truth translations and (optionally) predicted affinity scores to ground-truth-affinity scores. In some cases, the contextual translation system 112 performs training iterations until the values and/or weights of the translation neural network 506 do not change significantly across training iterations or otherwise satisfy some convergence criteria. Accordingly, the contextual translation system 112 trains the translation neural network 506 to generate contextual translations from term sequences and contextual identifiers.

Figure 5B:
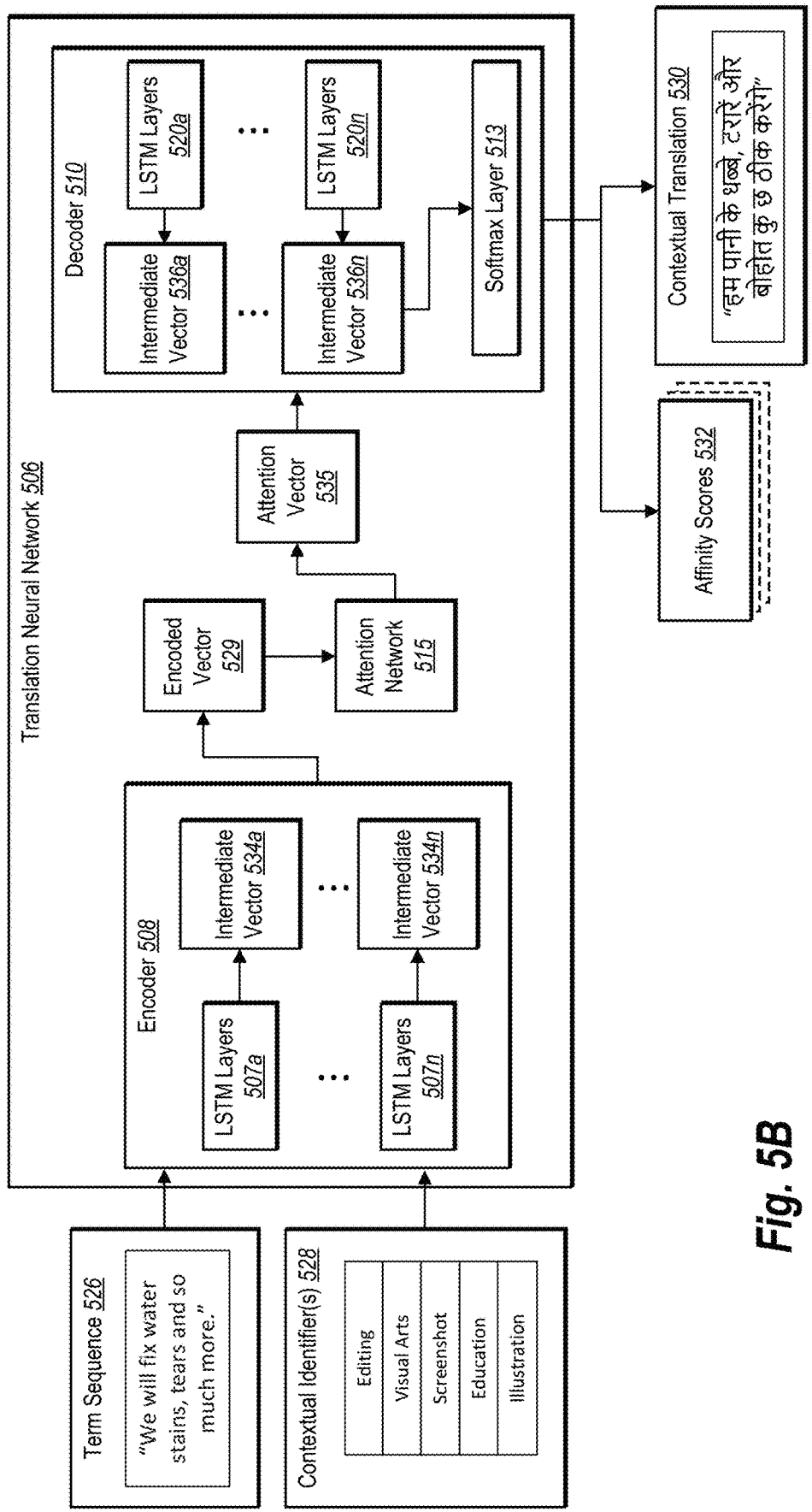
FIG. 5B illustrates a process for utilizing a translation neural network and contextual identifiers to generate a contextual translation in accordance with one or more embodiments.

In addition to training the translation neural network 506, in some embodiments, the contextual translation system 112 applies the translation neural network 506 to generate contextual translations of term sequences. In accordance with one or more embodiments, FIG. 5B illustrates the contextual translation system 112 applying the translation neural network 506 generate (i) a contextual translation 530 of a term sequence 526 based on contextual identifier(s) 528 and (ii) affinity scores 532 for the contextual translation 530. As shown in FIG. 5B, the translation neural network 506 utilizes the encoder 508 to generate an encoded vector 529 based on the term sequence 526 and the contextual identifier(s) 528. Based on an attention vector 535 from the attention network 515, the decoder 510 generates the contextual translation 530 and the affinity scores 532.

As shown in FIG. 5B, the contextual translation system 112 inputs the term sequence 526 and the contextual identifier(s) 528 into the translation neural network 506. As shown in FIG. 5B, the term sequence 526 comprises "We will fix water stains, tears and so much more." While the term sequence 526 constitutes a sentence in English, a term sequence can be of any length and in any source language. As further shown in FIG. 5B, the contextual identifier(s) 528 include "editing," "visual arts," "screenshot," "education," and "illustration." As discussed above, contextual identifiers can include various identifiers that indicate contextual features of a set of frames from the digital video file.

The contextual translation system 112 inputs the term sequence 526 and the contextual identifier(s) 528 into the translation neural network 506. More specifically, in some embodiments, the contextual translation system 112 provides the term sequence 526 and each of the contextual identifier(s) 528 to a different LSTM layer of the LSTM layers 507a-507n. Similar to the discussion above with regard to FIG. 5A, the encoder 508 utilizes the LSTM layers 507a-507n to generate intermediate vectors 534a-534n based on the term sequence 526 and the contextual identifier(s) 528. The encoder 508 subsequently concatenates or otherwise combines (or consolidates) the intermediate vectors 534a-534n to generate the encoded vector 529.

As further shown in FIG. 5B, the contextual translation system 112 provides the encoded vector 529 to the attention network 515. Based on the encoded vector 529, the attention network 515 generates the attention vector 535. Further, the contextual translation system 112 provides the attention vector 535 to the decoder 510. In some embodiments, the contextual translation system 112 inputs the attention vector 535 into one or more of the LSTM layers 520a-520n.

Based on the encoded vector 529, the decoder 510 utilizes the LSTM layers 520a-520n to generate intermediate vectors 536a-536n. The decoder 510 further provides the intermediate vectors 536a-536n to the softmax layer 513. Based on the intermediate vectors 536a-536n, the softmax layer 513 generates the contextual translation 530 and the affinity scores 532.

As shown in FIG. 5B FIG. 5A, the translation neural network 506 generates the contextual translation 530 as follows: "हम पानी के धब्बे, दरारें और बोहोत कु छ ठीक करेंगे ." As discussed above, the term "दरारें" means a rip, rather than a teardrop. In this embodiment, the contextual identifier(s) 528 indicate that the scene—and its corresponding set of frames—are more related to a rip than a teardrop. The translation neural network 506 generates the contextual translation 530 including the term "दरारे" based on the contextual identifier(s) 528. By utilizing the contextual identifier(s) 528, the translation neural network 506 generates a more accurate translation than conventional machine-translation systems.

As suggested above, an affinity score from the affinity scores 532 reflects an affinity between one of the contextual identifier(s) 528 and a translated term, translated phrase, or other portion of the contextual translation 530. For example, the term "tear" can have an affinity score corresponding to each of the contextual identifier(s) 528. As discussed below with regard to FIG. 6, the contextual translation system 112 can organize such affinity scores in an affinity array.

Figure 6:
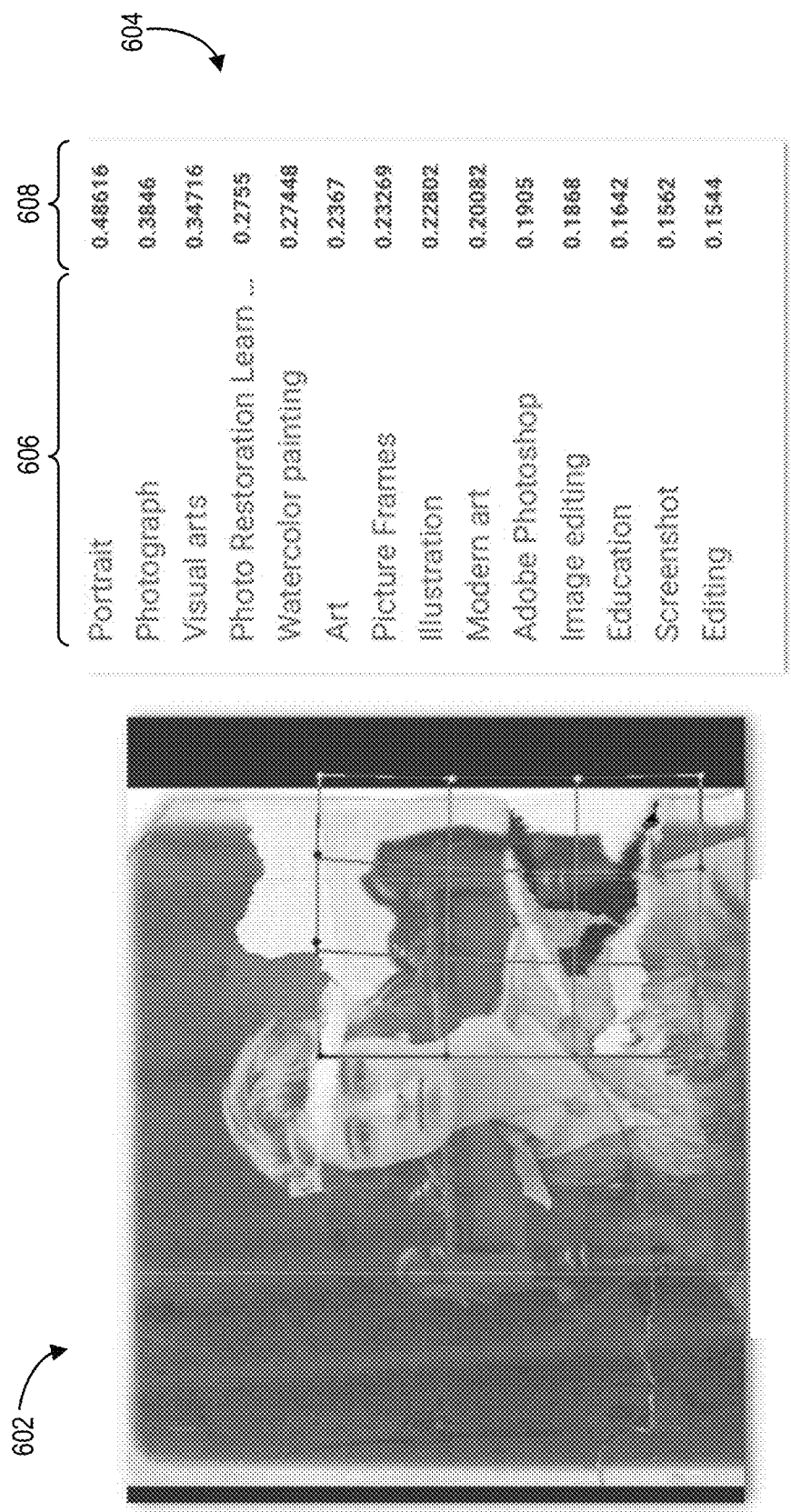
FIG. 6 illustrates an example affinity array including various affinity scores in accordance with one or more embodiments.

In accordance with one or more embodiments, FIG. 6 illustrates an affinity array 604. The affinity array 604 comprises affinity scores 608, where each affinity score reflects an affinity between a translated term and a particular contextual identifier from contextual identifiers 606. As shown in FIG. 6, the contextual identifiers 606 correspond to a frame 602 and (optionally) to frames adjacent or nearby in a digital video file to the frame 602, such as a subset of frames corresponding to a scene.

As depicted in FIG. 6, the contextual identifiers 606 indicate context for the frame 602 (or other frames) corresponding to the scene. Because an affinity score can reflect a translated term's affinity with a contextual identifier—or a candidate term's affinity with a contextual identifier—the contextual translation system 112 can use such an affinity score to select an appropriate term in a target language for translation. For example, a term "tear" that corresponds to an affinity score within the affinity array 604 is likely to be translated as a rip rather than as a teardrop—because the affinity scores 608 reflect affinities between a term and the contextual identifiers 606 related to editing, images, and art.

As further shown in FIG. 6, the affinity scores 608 are shown on a scale from [0,1] and are inversely proportional to an affinity a term in the target language has with a contextual identifier from the contextual identifiers 606. That is, the lower the affinity score, the greater an affinity between a term and the contextual identifier. For example, the affinity array 604 can include affinity scores corresponding to the term "tear" in a target language. In this example, the term "tear" has an affinity score of 0.1544 with the contextual identifier "Editing." This affinity score indicates a strong relationship between the contextual identifier "Editing" and the term "tear" in the target language. In other words, the contextual translation system 112, and more specifically the translation neural network 506, determined that the translation of the term "tear" should satisfy the context provided by the contextual identifier "Editing" to a large degree.

While the affinity scores 608 are inversely proportional, the contextual translation system 112 can generate affinity scores on a variety of scales, both proportional and inversely proportional to an indicated affinity. Further, while the affinity array 604 include both the contextual identifiers 606 and the affinity scores 608, an affinity array may include affinity scores and an alphanumeric, code, or other indicator for contextual identifiers.

Figure 7:
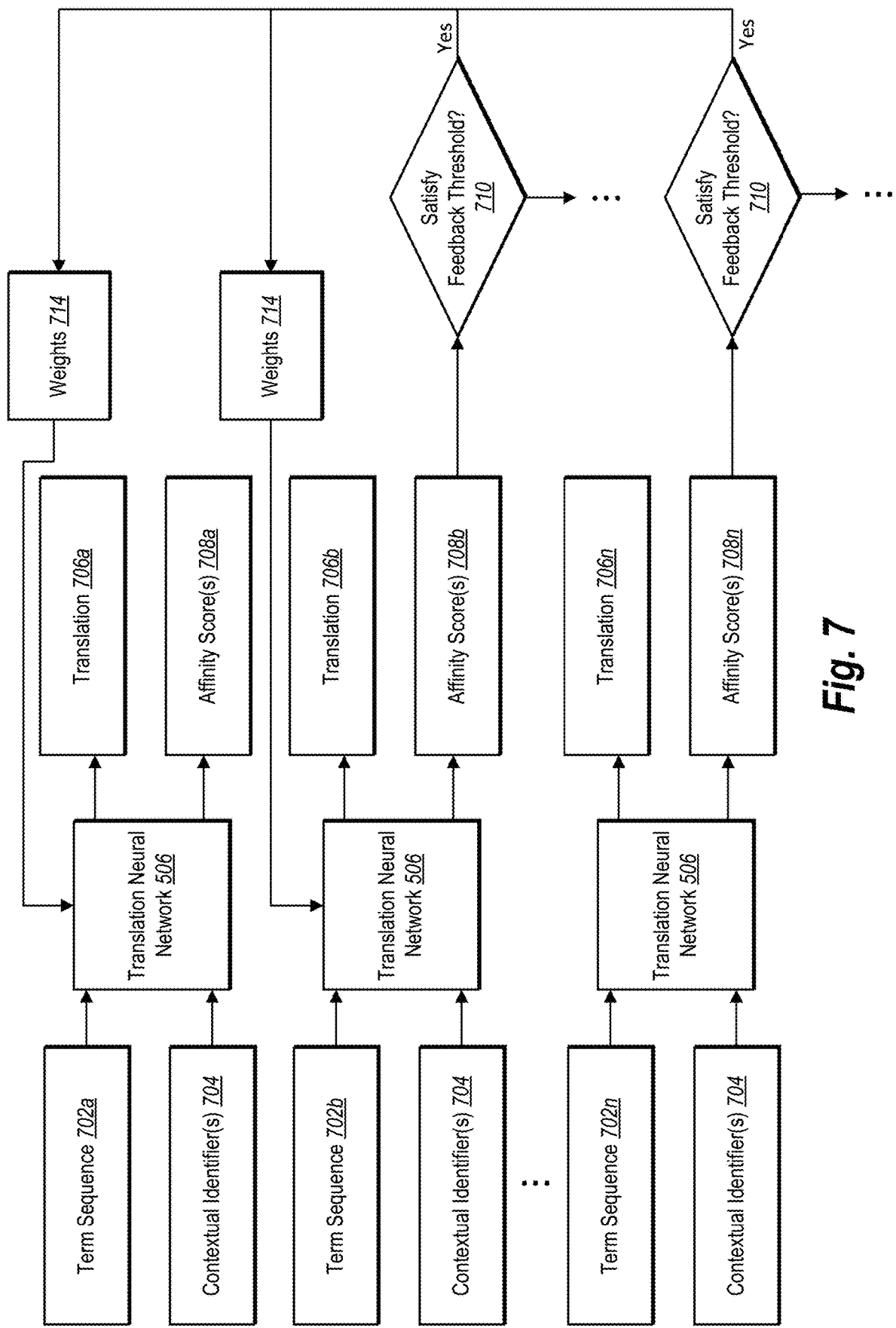
FIG. 7 illustrates a flowchart for a feedback loop utilizing affinity scores to improve contextual translations in accordance with one or more embodiments.

As noted above, in some embodiments, the contextual translation system 112 implements a feedback loop iteratively improve contextual translations. In accordance with one or more embodiments, FIG. 7 illustrates the contextual translation system 112 implementing a feedback loop based on affinity scores for translations. When implementing a feedback loop, in some embodiments, the contextual translation system 112 assigns weights to contextual identifiers and adjusts those weights based on changes to affinity scores for translations of different term sequences over multiple iterations. Based on one or more feedback thresholds, the contextual translation system 112 identifies changes to affinity scores corresponding to different contextual translations. When affinity scores satisfy one such threshold, the contextual translation system 112 adjusts the assigned weights and (in some cases) changes contextual translations to reflect the adjusted weights.

As shown in FIG. 7, the contextual translation system 112 uses a translation neural network 506 to iteratively translate different term sequences corresponding to a set of frames for a scene based on one or more contextual identifier(s) corresponding to the set of frames. For example, the contextual translation system 112 inputs a term sequence 702a in a source language and contextual identifier(s) 704 into the translation neural network 506. The translation neural network 506 subsequently generates a translation 706a in the target language and affinity score(s) 708a for the translation 706a. The translation 706a represents an initial translation. As discussed above, the translation neural network 506 can generate the affinity score(s) 708a as an affinity array including a set of affinity scores, where subsets of affinity scores corresponding to particular terms.

After determining the translation 706a, the contextual translation system 112 generates new translations in subsequent iterations. In separate iterations, for example, the contextual translation system 112 inputs the term sequences 702b-702n in the source language into the translation neural network 506. Based on the term sequences 702b-702n and contextual identifier(s) 704, the translation neural network 506 generates translations 706b-706n in the target language and affinity score(s) 708b-708n. These new affinity scores reflect affinities between the translations 706b-706n and the contextual identifier(s) 704.

After determining on or more of the affinity score(s) 708b-708n, the contextual translation system 112 performs the act 710 of determining whether a change in affinity score satisfies a feedback threshold. For example, the contextual translation system 112 can determine whether one or both of the affinity score(s) 708b-708n satisfy a feedback threshold relative to the affinity score(s) 708a. For instance, in some embodiments, the contextual translation system 112 determines whether differences between the affinity score(s) 708a and affinity score(s) 708b satisfy a feedback threshold.

As indicated by FIG. 7, the feedback threshold can constitute a variety of thresholds. For example, in some embodiments, the feedback threshold represents a threshold change in affinity scores corresponding to a contextual identifier (or among contextual identifiers) across multiple iterations. Similarly, in some cases, the feedback threshold represents a threshold change in affinity scores corresponding to a contextual identifier (or among contextual identifiers) between two iterations. In either case, the contextual translation system 112 can identify a change between (i) an affinity score corresponding to a first contextual identifier and (ii) an affinity score (or group of affinity scores) corresponding to a second contextual identifier. Further, the contextual translation system 112 can identify (i) a change between affinity scores reflecting an affinity between the same term (or phrase) in the target language and different contextual identifiers and (ii) a change between affinity scores reflecting an affinity between a translation of a full term sequence in the target language and different contextual identifiers.

If the contextual translation system 112 determines that the new affinity scores are not equal to (or less than) the feedback threshold—based on a comparison of affinity scores between or across iterations—the contextual translation system 112 continues to translate without adjusting (or determining) weights 714 for the contextual identifier(s) 704. If the contextual translation system 112 determines that the new affinity scores are equal to (or more than) the feedback threshold—based on a comparison of affinity scores between or across iterations—the contextual translation system 112 adjusts (or determines) the weights 714 for the contextual identifier(s) 704 and (in some cases) adjusts or retranslates term sequences in previous iterations.

As implied above, in some cases, the contextual translation system 112 implements multiple thresholds in a feedback loop. For example, the contextual translation system 112 can implement both a feedback threshold triggered by a single change in affinity scores between adjacent iterations and a feedback threshold triggered by several changes across adjacent iterations.

As shown in FIG. 7, for instance, if the contextual translation system 112 determines that the new affinity scores (e.g., the affinity score(s) 708b and 708n) satisfy a feedback threshold, the contextual translation system 112 adjusts or determines the weights 714 for the contextual identifier(s) 704. The contextual translation system 112 can initialize or update the weights 704 as input for the translation neural network 506. As just indicated, the contextual translation system 112 adjusts (or determines) the weights 714 based on the affinity scores satisfying a feedback threshold.

For instance, in one or more embodiments, the contextual translation system 112 adjusts (or determines) the weights 714 to reflect averages among affinity scores across multiple iterations (or in a new iteration) when new affinity scores satisfy the feedback threshold. Alternatively, in some implementations, the contextual translation system 112 adjusts (or determines) the weights 714 to reflect an increase or decrease in proportion to a change in affinity scores corresponding to a particular contextual identifier across multiple iterations (or in a new iteration) when new affinity scores satisfy the feedback threshold. As suggested above, the contextual translation system 112 can likewise determine (or adjust) a weight for contextual identifiers based on an initial affinity score corresponding to a particular translated term for an initial term sequence and a new affinity score corresponding to the same translated term for a subsequent term sequence.

After determining or updating the weights 714 for the contextual identifier(s) 704, the contextual translation system 112 provides the weights 714 to the translation neural network 506. Based on the weights 714, in some embodiments, the translation neural network generates an updated translation for a term sequence and updated affinity scores for the updated translation. For example, the translation neural network 506 can generate an updated translation for the term sequence 702a based on the weights 714 having been determined (or adjusted) in response to new affinity scores satisfying a feedback threshold.

In addition to generating updated translations based on new or adjusted weights, in some embodiments, the contextual translation system 112 utilizes such new or updated weights for subsequent translation iterations. Indeed, in some embodiments, the contextual translation system 112 uses new or updated weights for subsequent translation iterations—until the contextual translation system 112 readjusts the weights 714 for the contextual identifier(s) 704 based on new affinity scores satisfying the feedback threshold. Further, the contextual translation system 112 can apply the translation neural network 506 to again retranslate the term sequence 702a (or again retranslate the term sequence 702b) based on the readjusted weights. Accordingly, the contextual translation system 112 can continuously improve the contextual translations.

To further illustrate the feedback loop, in some embodiments, the contextual translation system 112 uses the translation neural network 506 to translate a first term sequence from a source language to a first translation in a target language based on contextual identifiers corresponding to a set of frames for a scene. For instance, the contextual translation system 112 translates "The pitcher threw the ball" from English to "La cruche a lancé la balle" in French. But the term "cruche" reflects a jug or other liquid receptacle, rather than an athlete throwing a ball. In addition to generating such a translation, the contextual translation system 112 uses the translation neural network 506 to determine a first affinity score of 0.809 indicating an affinity between (i) a contextual identifier of "Ball Throwing" for the set of frames and (ii) the translated term "cruche." When affinity scores are inversely proportional to affinity on a scale of 0 to 1, for instance, the affinity between the contextual identifier and a first translated term of "cruche" is relatively low for the first translation.

Continuing the example, the contextual translation system 112 uses the translation neural network 506 to translate a second term sequence from the source language to a second translation in the target language based on the contextual identifiers. For instance, the contextual translation system 112 translates "The pitcher throws quickly" from English to "Le lanceur jette rapidement" in French. The term "lanceur" reflects a person who throws something (e.g., a baseball pitcher), rather than a jug or liquid receptacle. The contextual translation system 112 likewise uses the translation neural network 506 to determine a second affinity score of 0.115 indicating an affinity between (i) the contextual identifier of "Ball Throwing" for the set of frames and (ii) the translated term "lanceur." When affinity scores are inversely proportional to affinity as described above, the affinity between the contextual identifier and a second translated term of "lanceur" is relatively high for the second translation.

In addition to generating the first and second translations, the contextual translation system 112 identifies that the first term sequence and the second term sequence both include the term "pitcher" in English. The contextual translation system 112 further identifies that the first translation and the second translation include different translated terms in the target language for the term "pitcher." That is, the first translation includes "cruche" in French as a translation of "pitcher" from English, while the second translation includes "lanceur" in French as a translation of "pitcher" from English. Based on identifying different translated terms, the contextual translation system 112 determines a difference of 0.694 between the first affinity score of 0.809 and the second affinity score of 0.115.

As indicated above, the contextual translation system 112 further compares the difference between the first affinity score and the second affinity score to a feedback threshold. In this case, the affinity-score difference satisfies the feedback threshold by equaling (or exceeding) 0.200, although other thresholds may be used. Accordingly, the contextual translation system 112 determines that the second affinity score satisfies a feedback threshold relative to the first affinity score.

Based on the second affinity score satisfying the feedback threshold, the contextual translation system 112 determines (or updates) a weight for the contextual identifier of "Ball Throwing" based on the second affinity score. For example, the contextual translation system 112 weights the contextual identifier more (or less) heavily to modify affinity scores for translated terms with a greater affinity for the contextual identifier of "Ball Throwing." Based on the new or updated weight for the contextual identifier, the contextual translation system 112 utilizes the translation neural network 506 to retranslate the first term sequence of "The pitcher threw the ball" to "Le lanceur a lancé la balle" as an updated translation. Accordingly, the contextual translation system 112 can utilize the feedback loop to improve contextual translations.

Figure 8A:
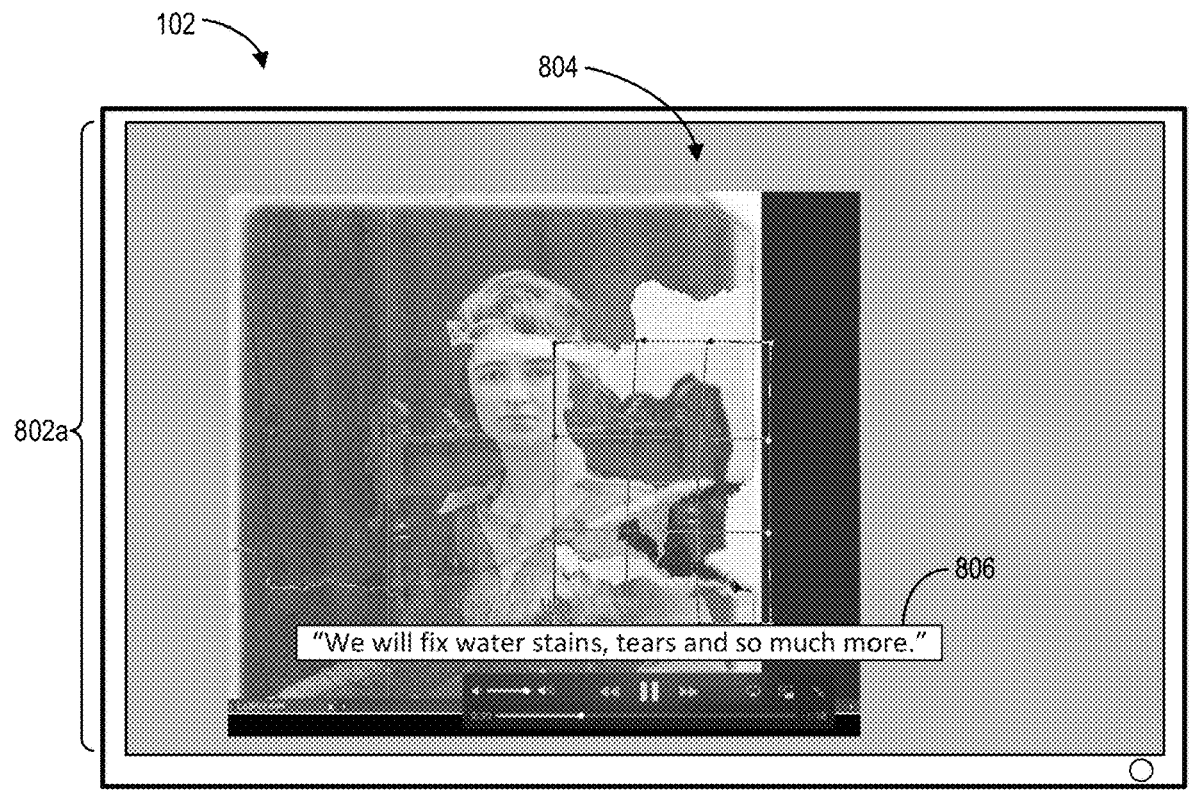
FIGS. 8A-8B illustrate example graphical user interfaces for a video player implementing subtitles from the contextual translation system in accordance with one or more embodiments.
Figure 8B:
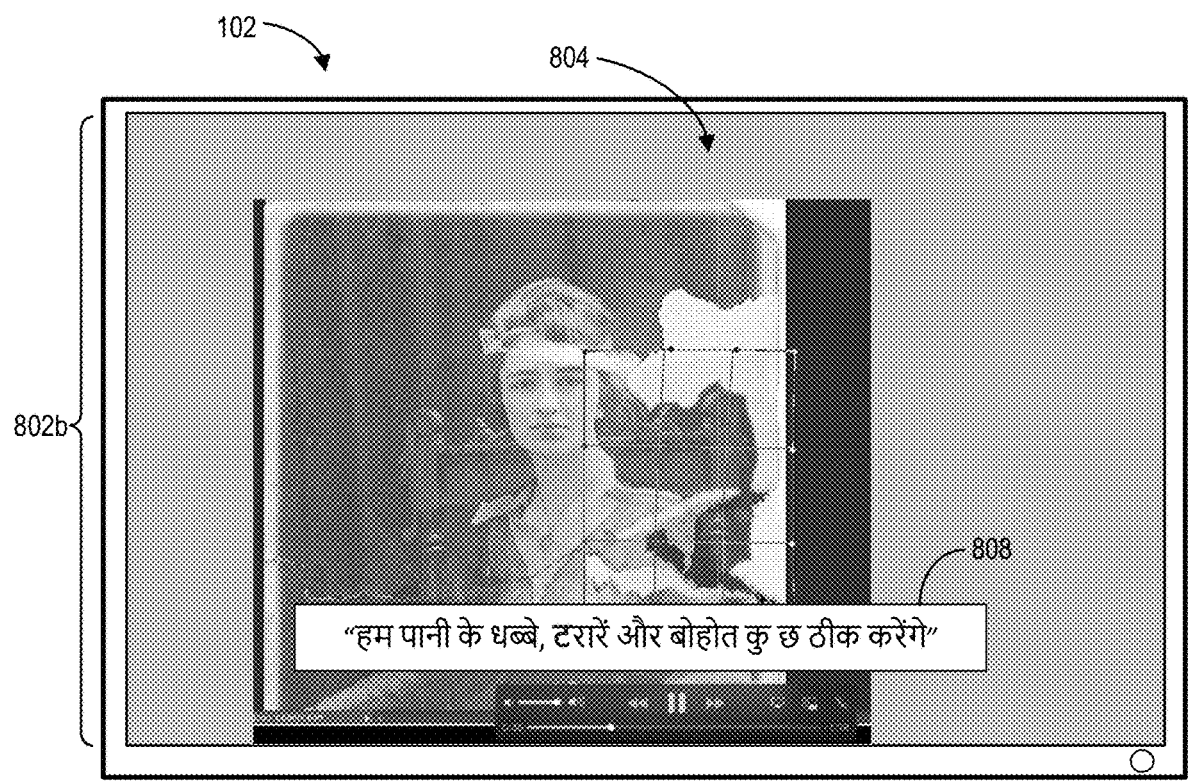

Turning to FIGS. 8A-8B, as discussed above, in one or more embodiments, the contextual translation system 112 translates term sequences corresponding to a digital video file. For instance, the contextual translation system 112 translates subtitles associated with a digital video file. Additionally, in one or more embodiments, the contextual translation system 112 provides contextual translations of subtitles from a source language to a target language for display within a video corresponding to the digital video file. Accordingly, the contextual translation system 112 can provide translated subtitles for a variety of digital videos in a variety of languages. For example, the contextual translation system 112 can provide subtitles to a client device to present in a video to a viewer. In some embodiments, for instance, the content management system 110 provides, over the network 106, a digital video to the client device 102 (e.g. via the client application 104).

In accordance with one or more embodiments, FIGS. 8A and 8B illustrate the contextual translation system 112 providing a subtitle 806 and a translated subtitle 808 for display within a video 804 for the client device 102. FIGS. 8A and 8B depict graphical user interfaces from the perspective of the client device 102 implementing computer-executable instructions of the client application 104 for the content management system 110 or for the contextual translation system 112 to perform certain actions. In FIGS. 8A and 8B, the client device 102 may detect various suitable user interactions, including, but not limited to, a keyboard input, a mouse click, a stylus interaction with a touch screen, or a touch gesture with a touch screen.

As shown in FIG. 8A, for instance, the client device 102 presents the video 804 and the subtitle 806 in a source language within a graphical user interface 802a. Although FIG. 8A depicts the subtitle 806 in English as the source language, the contextual translation system 112 can translate a variety of source languages. While FIG. 8A depicts a particular embodiment of the graphical user interface 802a as a video player, the contextual translation system 112 can provide, and the client device 102 can present, videos in graphical user interfaces in accordance with a variety of designs.

As indicated by FIG. 8B, the contextual translation system applies a contextual neural network and a translation neural network to translate the subtitle 806 based on contextual identifiers corresponding to a scene within the video 804. As shown in FIG. 8B, the client device 102 presents the video 804 and the translated subtitle 808 in the target language within the graphical user interface 802b. Although FIG. 8B depicts the subtitle 808 in Hindi as the target language, the contextual translation system 112 can generate translations in a variety of target languages.

As discussed above, the contextual translation system 112 determines a subset of frames correspond to a term sequence. The contextual translation system 112 determines a contextual translation corresponding to the term sequence. Accordingly, the contextual translation system 112 can present a contextual translation of a term sequence over such a subset of frames. Thus, the contextual translation system 112 provides the contextual translation as subtitles.

Figure 9:
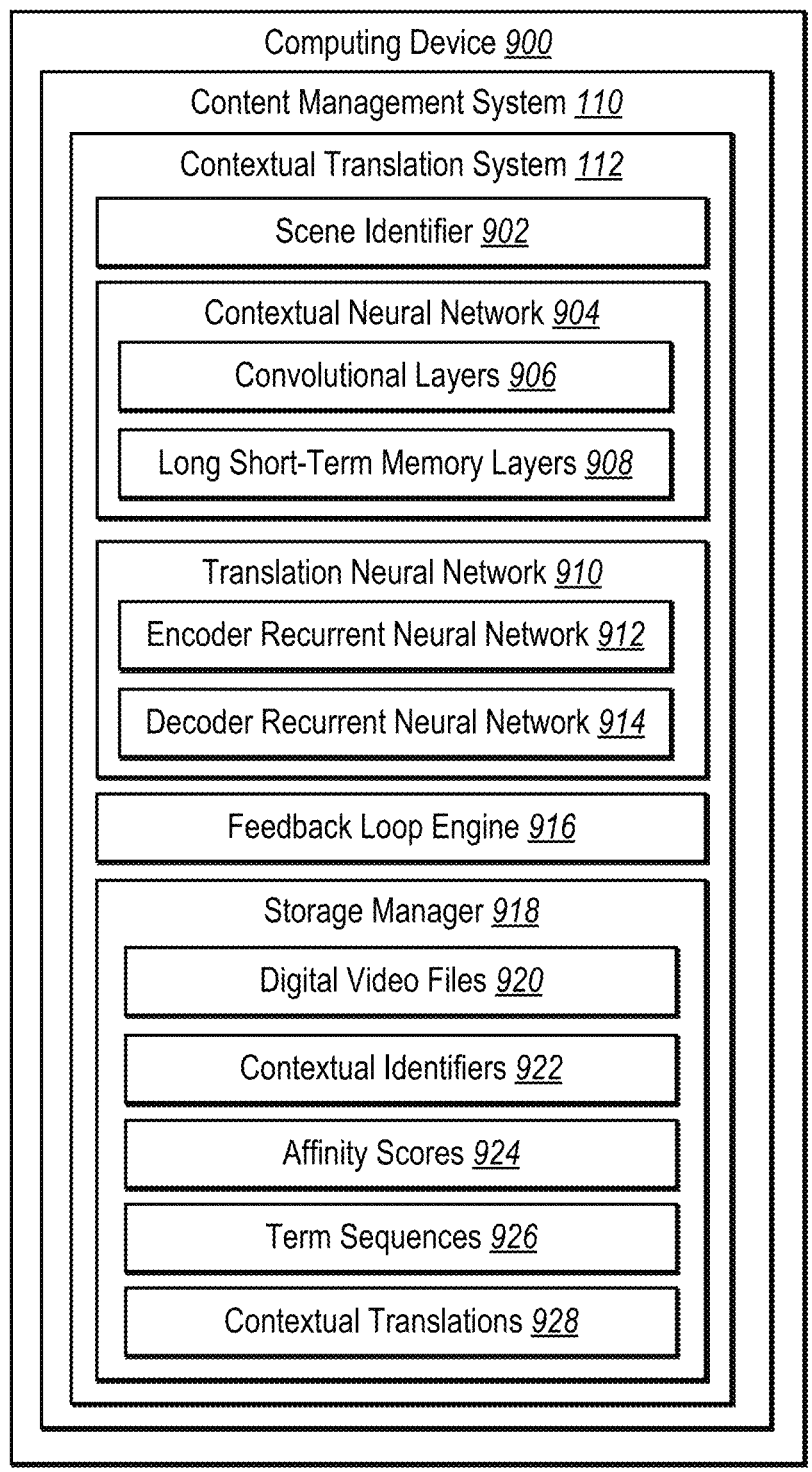
FIG. 9 illustrates a schematic diagram of an example architecture of the content management system and the contextual translation system of FIG. 1 in accordance with one or more embodiments.

Turning now to FIG. 9, this figure provides additional detail regarding components and features of a contextual translation system. In particular, FIG. 9 illustrates a computing device 900 implementing the content management system 110 and the contextual translation system 112. The computing device 900 can include one or more servers (e.g., the server device(s) 108) and/or one or more client devices (e.g., the client device 102). As shown in FIG. 9, the computing device 900 includes a scene identifier 902, a contextual neural network 904, a translation neural network 910, a feedback loop engine 916, and/or a storage manager 918.

As shown in FIG. 9, the computing device 900 includes the scene identifier 902. The scene identifier 902 identifies scenes within videos, including scenes within the digital video files 920. In some embodiments, for instance, the scene identifier 902 identifies sets of frames. In certain cases, the scene identifier 902 identifies sets of frames corresponding to different scenes based on (i) metadata within a video file or within video-data packets or (ii) similarity of image features between (or among) contiguous frames from the video. As indicated above, in some implementations, the scene identifier 902 identifies subsets of frames corresponding to different scenes as depicted in FIG. 3 and as described above. In some cases, the scene identifier 902 stores or identifies the scenes using scene indicators.

As also shown in FIG. 9, the computing device 900 includes the contextual neural network 904, which in turn includes convolutional layers 906 and long-short-term-memory layers 908. The contextual neural network 904 generates contextual identifiers based on a set of frames corresponding to a scene from a digital video, including as identified by the scene identifier 902. More specifically, the convolutional layers 906 generate a frame vector and provide the frame vector to the long-short-term-memory layers 908. The long-short-term-memory layers 908 generate contextual identifiers based on the frame vector.

Additionally, as shown in FIG. 9, the computing device 900 includes the translation neural network 910, which in turn includes an encoder recurrent neural network 912 and a decoder recurrent neural network 914. The translation neural network 910 generates contextual translations and affinity scores based on term sequences and corresponding contextual identifiers. More specifically, the encoder recurrent neural network 912 generates an encoded vector based on a term sequence and corresponding contextual identifiers. The decoder recurrent neural network 914 generates the contextual translation and affinity scores based on the encoded vector.

Further, as shown in FIG. 9, the computing device 900 includes the feedback loop engine 916. The feedback loop engine 916 can utilize feedback thresholds to implement a feedback loop based on differences between affinity scores, as explained above with regard to FIG. 7. The feedback loop engine 916 can generate and update weights for contextual identifiers. Additionally, the feedback loop engine 916 can cause the translation neural network 910 to generate updated translations based on new affinity scores satisfying the feedback thresholds.

Also, as shown in FIG. 9, the computing device 900 includes the storage manager 918. The storage manager 918 accesses and stores files, indicators, and other data for the contextual translation system 112. For example, the storage manager 918 can communicate with one or more of the scene identifier 902, the contextual neural network 904, the translation neural network 910, and the feedback loop engine 916. Further, as shown in FIG. 9, the storage manager 918 includes digital video files 920, contextual identifiers 922, affinity scores 924, term sequences 926, and contextual translations 928.

Each of the components 900-928 of the contextual translation system 112 can include software, hardware, or both. For example, the components 900-928 can include one or more instructions stored on a non-transitory computer-readable storage medium and executable by processors of one or more computing devices, such as a client device or server device. When executed by the one or more processors, the computer-executable instructions of the contextual translation system 112 can cause the computing device(s) to perform the methods described herein. Alternatively, the components 900-928 can include hardware, such as a special-purpose processing device to perform a certain function or group of functions. Alternatively, the components 900-928 of the contextual translation system 112 can include a combination of computer-executable instructions and hardware.

Furthermore, the components 900-928 of the contextual translation system 112 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 900-928 of the contextual translation system 112 may be implemented as a stand-alone application, such as a desktop or mobile application. Furthermore, the components 900-928 may be implemented as one or more web-based applications hosted on a remote server. The components 900-928 may also be implemented in a suite of mobile device applications or "apps." To illustrate, the components 900-928 may be implemented in an application, including, but not limited to, ADOBE PREMIERE PRO, ADOBE CREATIVE CLOUD, and ADOBE FLASH PLAYER. "ADOBE," "PREMIERE PRO," "CREATIVE CLOUD," "FLASH," and "FLASH PLAYER" are either registered trademarks or trademarks of Adobe Inc. in the United States and/or other countries.

Figure 10:
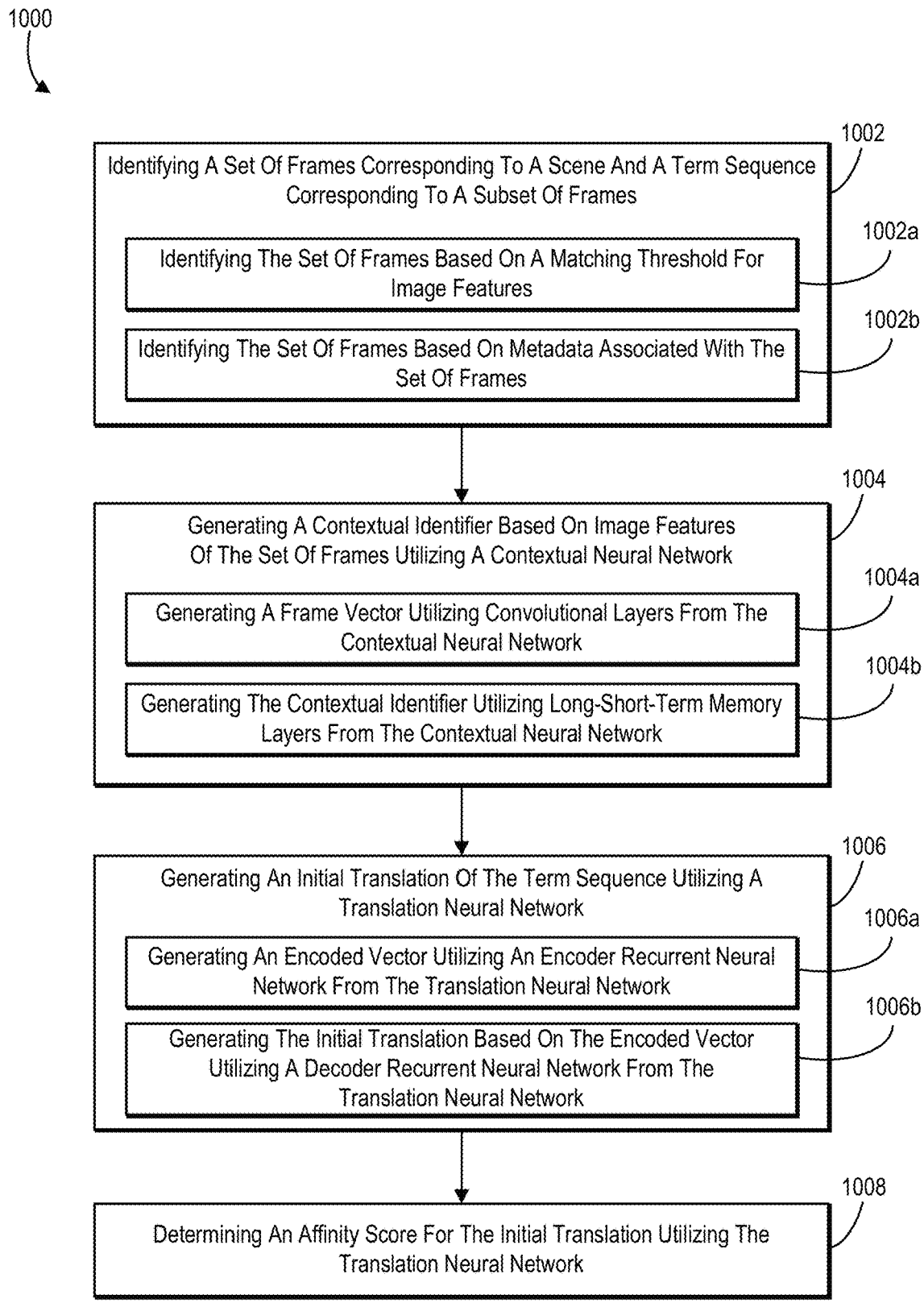
FIG. 10 illustrates a flowchart of a series of acts for a contextual translation system in accordance with one or more embodiments.

FIGS. 1-9, the corresponding text, and the examples provide a number of different methods, systems, devices, and non-transitory computer-readable media of the contextual translation system 112. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

Turning now to FIG. 10, this figure illustrates a series of acts 1000 of generating a contextual translation in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 for identifying a set of frames corresponding to a scene and a term sequence corresponding to a subset of fames. More specifically, the act 1002 can include identifying, from a digital video file, a set of frames corresponding to a scene and a term sequence corresponding to a subset of frames. Additionally, or alternatively, the act 1002 can include identifying, from a digital video file, a set of frames corresponding to a scene and a first term sequence and a second term sequence corresponding to the set of frames. In some cases, the first term sequence corresponds to a first subset of frames from the set of frames and the second term sequence corresponds to a second subset of frames from the set of frames. As further indicated by FIG. 10, the act 1002 may include (i) an act 1002a of identifying the set of frames based on a matching threshold for image features, or (ii) an act 1002b of identifying the set of frames based on metadata associated with the set of frames. In some embodiments, the term sequence corresponding to the subset of frames is a sentence from subtitles for the digital video file in a source language.

In some embodiments, for example, identifying the set of frames based on a matching threshold for image features comprises comparing image features within each frame within a digital video file to image features within a set of contiguous frames; and identifying one or both of an initial frame and an editing frame for each scene comprising image features distinguishable from the contiguous frames with reference to a matching threshold.

Additionally, as shown in FIG. 10, the series of acts 1000 includes an act 1004 for generating a contextual identifier based on image features of the set of frames utilizing a contextual neural network. More specifically, the act 1004 can include generating a contextual identifier for the set of frames based on image features of the set of frames utilizing a contextual neural network. As further indicated by FIG. 10, the act 1004 may include (i) an act 1004a of generating a frame vector utilizing convolutional layers from a contextual neural network, and (ii) an act 1004b of generating the contextual identifier utilizing long-short-term memory layers from the contextual neural network.

As suggested above, in some implementations, the act 1004 includes generating a set of contextual identifiers indicating context for the set of frames based on image features of the set of frames by applying convolutional layers and long-short-term-memory (LSTM) layers from a contextual neural network to the set of frames. In some embodiments, the contextual identifiers comprise one or more contextual features of the subset of frames. As suggested above, the act 1004 can include generating a set of contextual identifiers corresponding to the set of frames based on the image features of the set of frames utilizing the contextual neural network.

In particular, and as indicated above, the act 1004 can also include generate the contextual identifier utilizing the contextual neural network by generating a frame vector based on a frame from the set of frames utilizing convolutional layers from the contextual neural network, and generating the contextual identifier based on the frame vector utilizing long-short-term-memory (LSTM) layers from the contextual neural network.

As also shown in FIG. 10, the series of acts 1000 includes an act 1006 for generating an initial translation of the term sequence utilizing a translation neural network. More specifically, the act 1006 can include generating an initial translation of the term sequence from a source language to a target language. Additionally, or alternatively, the act 1006 can include, based on the contextual identifier, utilizing a translation neural network to generate one or both of (i) a first translation of the first term sequence and a first affinity score indicating an affinity between the contextual identifier and the first translation and (ii) a second translation of the second term sequence and a second affinity score indicating an affinity between the contextual identifier and the second translation. As further indicated by FIG. 10, the act 1006 may include (i) an act 1006a of generating an encoded vector utilizing an encoder recurrent neural network from the translation neural network, and (ii) an act 1006b of generating the initial translation based on the encoded vector utilizing a decoder recurrent neural network from the translation neural network.

Additionally, the act 1006 can include providing, for display by a client device, the initial translation as a text corresponding to the scene. In some embodiments, providing the initial translation comprises providing the initial translation as subtitles for the digital video file in a target language. Further, the act 1006 can include applying the translation neural network by generating an encoded vector based on the term sequence and the set of contextual identifiers utilizing the encoder recurrent neural network from the translation neural network; and generating the initial translation and the set of affinity scores based on the encoded vector utilizing the decoder recurrent neural network from the translation neural network Further, as shown in FIG. 10, the series of acts 1000 includes an act 1008 determining an affinity score for the initial translation utilizing the translation neural network. More specifically, the act 1008 can include determining an affinity score for the initial translation reflecting an affinity between the contextual identifier and a translated term from the initial translation in the target language. In some embodiments, the act 1008 can include generating a first affinity score indicating an affinity between the contextual identifier and the first translation and a second affinity score indicating an affinity between the contextual identifier and the second translation. Similarly, the act 1008 can include applying the translation neural network to determine a set of affinity scores for the initial translation reflecting affinities between particular contextual identifiers from the set of contextual identifiers and particular translated terms from the initial translation of the term sequence in the target language.

Further, the act 1008 can include generating the set of affinity scores by generating a first affinity array comprising a first subset of affinity scores reflecting an affinity between each contextual identifier from the set of contextual identifiers and a first translated term from the initial translation in the target language, and generating a second affinity array comprising a second subset of affinity scores reflecting an affinity between each contextual identifier from the set of contextual identifiers and a second translated term from the initial translation in the target language.

Additionally, or alternatively, the series of acts 1000 can include, based on the second affinity score satisfying a feedback threshold relative to the first affinity score, generating an updated translation of the first term sequence utilizing the translation neural network. For example, in some embodiments, generating the updated translation of the first term sequence utilizing the translation neural network comprises changing the first translated term to the second translated term.

In one or more embodiments, the series of acts 1000 can include determining that the second affinity score satisfies the feedback threshold relative to the first affinity score by identifying that the first translation of the first term sequence includes a first translated term in a target language for a term in a source language from the first term sequence, identifying that the second translation of the second term sequence includes a second translated term in the target language for the term in the source language from the second term sequence, wherein the first translated term differs from the second translated term, determining the first affinity score for the first translation reflects a first affinity between the contextual identifier and the first translated term and the second affinity score reflects a second affinity between the contextual identifier and the second translated term, and determining that a difference between the first affinity score and the second affinity score satisfies the feedback threshold.

The series of acts 1000 can also include identifying, from the digital video file, a new subset of frames corresponding to the scene and a new term sequence corresponding to the new subset of frames, and applying the translation neural network to the set of contextual identifiers and the new term sequence to generate a new translation of the new term sequence from the source language to the target language, and determine a new affinity score for the new translation reflecting an affinity between a new contextual identifier from the set of contextual identifiers and a new translated term from the new translation in the target language.

Relatedly, the series of acts 1000 can include determining that the new affinity score for the new translation satisfies a feedback threshold relative to the affinity score for the initial translation, based on determining that the new affinity score for the new translation satisfies the feedback threshold, determining a first weight for the contextual identifier and a second weight for the new contextual identifier, and based on the first weight for the contextual identifier and the second weight for the new contextual identifier, applying the translation neural network to the set of contextual identifiers and the term sequence to generate an updated translation of the term sequence from the source language to the target language. The series of acts 1000 can also include determining an adjusted set of affinity scores reflecting affinities between particular contextual identifiers from the set of contextual identifiers and particular translated terms from the updated translation in the target language.

The series of acts 1000 can also include determining the adjusted set of affinity scores based on the first weight and the second weight by adjusting a first affinity array to comprise a first subset of affinity scores reflecting an affinity between each contextual identifier from the set of contextual identifiers and a first translated term from the updated translation in the target language; and adjusting a second affinity array to comprise a second subset of affinity scores reflecting an affinity between each contextual identifier from the set of contextual identifiers and a second translated term from the updated translation in the target language.

Additionally, the series of acts 1000 can include applying the translation neural network to the set of contextual identifiers and subsequent term sequences corresponding to subsequent subsets of frames of the scene to determine subsequent affinity scores for translations of the subsequent term sequences, determining that the subsequent affinity scores for the translations of the subsequent term sequences satisfy a feedback threshold relative to the affinity score for the initial translation, based on determining that the subsequent affinity scores for the translations of the subsequent term sequences satisfy the feedback threshold, determining a set of weights for the set of contextual identifiers, and based on the set of weights, generating an updated translation of the term sequence from the source language to the target language utilizing the translation neural network.

Further, the series of acts 1000 can include to determining that the subsequent affinity scores for the translations of the subsequent term sequences satisfy a feedback threshold relative to the affinity score for the initial translation by determining that a number of the subsequent affinity scores denote a change relative to the affinity score for the initial translation that satisfies the feedback threshold; and determining that the number of the subsequent affinity scores satisfies the feedback threshold.

The series of acts 1000 can also include determining that the subsequent affinity scores for the translations of the subsequent term sequences satisfy the feedback threshold relative to the affinity score for the initial translation by determining that the subsequent term sequences comprise a term in the source language corresponding to the translated term in the target language from the initial translation, determining that the subsequent affinity scores for the subsequent translations reflect affinities between a new contextual identifier and a new translated term from the subsequent translations in the target language, and determining that the subsequent affinity scores satisfy the feedback threshold relative to the affinity score.

Further, the series of acts 1000 can also include training the contextual neural network by generating a predicted frame vector based on a training frame from a set of training frames utilizing convolutional layers from the contextual neural network, generating a predicted contextual identifier based on the predicted frame vector utilizing long-short-term-memory (LSTM) layers from the contextual neural network, and adjusting internal parameters of the LSTM layers based on a comparison of the predicted contextual identifier and a ground-truth-contextual identifier corresponding to the training frame.

Additionally, the series of acts 1000 can include training the translation neural network by generating an encoded-training vector based on a training term sequence and a set of predicted contextual identifiers utilizing the encoder recurrent neural network from the translation neural network, generating a predicted translation based on the encoded-training vector utilizing the decoder recurrent neural network from the translation neural network, and adjusting internal parameters of encoder recurrent neural network from the translation neural network or the decoder recurrent neural network based on a comparison of the predicted translation and a ground-truth translation corresponding to the training term sequence.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

FIG. 11 illustrates a block diagram of example computing device 1100 that may be configured to perform one or more of the processes described above. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for digitizing real-world objects, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions related to object digitizing processes (e.g., digital scans, digital models).

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example and not by way of limitation, the communication interface 1110 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A non-transitory computer readable medium comprising instructions that, when executed by at least one processor, cause a computer system to:
   identify, from a digital video file, a set of frames corresponding to a scene, a first term sequence corresponding to a first subset of frames, and a second term sequence corresponding to a second subset of frames;
   generate a contextual identifier for the set of frames based on image features of the set of frames utilizing a contextual neural network to analyze the image features;
   apply a translation neural network to the contextual identifier and the first term sequence and the second term sequence to:
      generate an initial translation of the first term sequence from a source language to a target language and a first affinity score reflecting a first degree to which the contextual identifier is related to the initial translation;
      generate a second translation of the second term sequence from the source language to the target language and a second affinity score reflecting a second degree to which the contextual identifier is related to the second translation; and
   based on the second affinity score satisfying a feedback threshold relative to the first affinity score, generating an updated translation of the first term sequence utilizing the translation neural network.

2. The non-transitory computer readable medium of claim 1, further comprising instructions that, when executed by at least one processor, further cause the computer system to:
   generate a set of contextual identifiers corresponding to the set of frames based on the image features of the set of frames utilizing the contextual neural network; and
   apply the translation neural network to determine a set of affinity scores for the initial translation reflecting affinities between particular contextual identifiers from the set of contextual identifiers and particular translated terms from the initial translation of the first term sequence in the target language.

3. The non-transitory computer readable medium of claim 2, further comprising instructions that, when executed by at least one processor, further cause the computer system to generate the set of affinity scores by:
   generating a first affinity array comprising a first subset of affinity scores reflecting a degree to which each contextual identifier from the set of contextual identifiers is related to a first translated term from the initial translation in the target language; and
   generating a second affinity array comprising a second subset of affinity scores reflecting a degree to which each contextual identifier from the set of contextual identifiers is related to a second translated term from the initial translation in the target language.

4. The non-transitory computer readable medium of claim 2, further comprising instructions that, when executed by at least one processor, further cause the computer system to:
   identify, from the digital video file, a new subset of frames corresponding to the scene and a new term sequence corresponding to the new subset of frames; and
   apply the translation neural network to the set of contextual identifiers and the new term sequence to:
      generate a new translation of the new term sequence from the source language to the target language; and
      determine a new affinity score for the new translation reflecting an affinity between a new contextual identifier from the set of contextual identifiers and a new translated term from the new translation in the target language.

5. The non-transitory computer readable medium of claim 4, further comprising instructions that, when executed by at least one processor, further cause the computer system to:
   determine that the new affinity score for the new translation satisfies a feedback threshold relative to the first affinity score;
   based on determining that the new affinity score for the new translation satisfies the feedback threshold, determine a first weight for the contextual identifier and a second weight for the new contextual identifier; and based on the first weight for the contextual identifier and the second weight for the new contextual identifier, apply the translation neural network to the set of contextual identifiers and the first term sequence to generate an additional updated translation of the first term sequence from the source language to the target language.

6. The non-transitory computer readable medium of claim 2, further comprising instructions that, when executed by at least one processor, further cause the computer system to:

apply the translation neural network to the set of contextual identifiers and subsequent term sequences corresponding to subsequent subsets of frames of the scene to determine subsequent affinity scores for translations of the subsequent term sequences;

determine that the subsequent affinity scores for the translations of the subsequent term sequences satisfy a feedback threshold relative to the first affinity score;

based on determining that the subsequent affinity scores for the translations of the subsequent term sequences satisfy the feedback threshold, determine a set of weights for the set of contextual identifiers; and based on the set of weights, generate an additional updated translation of the first term sequence from the source language to the target language utilizing the translation neural network.

7. The non-transitory computer readable medium of claim 6, further comprising instructions that, when executed by at least one processor, further cause the computer system to determine that the subsequent affinity scores for the translations of the subsequent term sequences satisfy the feedback threshold relative to the first affinity score by:

determining that the subsequent term sequences comprise a term in the source language corresponding to a translated term in the target language from the initial translation;

determining that the subsequent affinity scores for the subsequent translations reflect degrees to which a new contextual identifier is related to a new translated term from the translations of the subsequent term sequences in the target language; and determining that the subsequent affinity scores satisfy the feedback threshold relative to the first affinity score.

8. The non-transitory computer readable medium of claim 1, further comprising instructions that, when executed by at least one processor, further cause the computer system to generate the contextual identifier utilizing the contextual neural network by:

generating a frame vector based on a frame from the set of frames utilizing convolutional layers from the contextual neural network; and generating the contextual identifier based on the frame vector utilizing long-short-term-memory (LSTM) layers from the contextual neural network.

9. A system comprising:

one or more memory devices comprising a digital video file; and one or more server devices configured to cause the system to:

identify, from the digital video file, a set of frames, a first term sequence corresponding to a first subset of frames, and a second term sequence corresponding to a second subset of frames;

generate a contextual identifier for the set of frames based on image features of the set of frames utilizing a contextual neural network to analyze the image features;

apply a translation neural network to the contextual identifier and the first term sequence and the second term sequence to:

generate an initial translation of the first term sequence from a source language to a target language and a first affinity score reflecting a first degree to which the contextual identifier is related to the initial translation;

generate a second translation of the second term sequence from the source language to the target language and a second affinity score reflecting a second degree to which the contextual identifier is related to the second translation; and based on the second affinity score satisfying a feedback threshold relative to the first affinity score, generating an updated translation of the first term sequence utilizing the translation neural network.

10. The system of claim 9, wherein the one or more server devices are configured to further cause the system to:

determine a set of affinity scores for the initial translation reflecting a degree to which particular contextual identifiers are related to a set of contextual identifiers and particular translated terms from the initial translation in the target language by:

generating a first affinity array comprising a first subset of affinity scores reflecting a degree to which each contextual identifier from the set of contextual identifiers is related to a first translated term from the initial translation in the target language; and generating a second affinity array comprising a second subset of affinity scores reflecting a degree to which each contextual identifier from the set of contextual identifiers is related to a second translated term from the initial translation in the target language.

11. The system of claim 9, wherein the one or more server devices are configured to further cause the system to:

identify, from the digital video file, a new subset of frames corresponding to a scene and a new term sequence corresponding to the new subset of frames; and apply the translation neural network to a set of contextual identifiers and the new term sequence to:

generate a new translation of the new term sequence from the source language to the target language; and determine a new affinity score reflecting an affinity between a new contextual identifier from the set of contextual identifiers and a new translated term from the new translation in the target language.

12. The system of claim 11, wherein the one or more server devices are configured to further cause the system to:

determine that the new affinity score for the new translation satisfies a feedback threshold relative to the first affinity score;

based on determining that the new affinity score for the new translation satisfies the feedback threshold, determine a first weight for the contextual identifier and a second weight for a new contextual identifier; and based on the first weight for the contextual identifier and the second weight for the new contextual identifier, apply the translation neural network to the set of contextual identifiers and the first term sequence to:

generate an additional updated translation of the first term sequence from the source language to the target language; and determine an adjusted set of affinity scores reflecting affinities between particular contextual identifiers from the set of contextual identifiers and particular translated terms from the additional updated translation in the target language.

13. The system of claim 12, wherein the one or more server devices are configured to further cause the system to determine the adjusted set of affinity scores based on the first weight and the second weight by:
adjusting a first affinity array to comprise a first subset of affinity scores reflecting a degree to which each contextual identifier from the set of contextual identifiers is related to a first translated term from the additional updated translation in the target language; and
adjusting a second affinity array to comprise a second subset of affinity scores reflecting a degree to which each contextual identifier from the set of contextual identifiers is related to a second translated term from the additional updated translation in the target language.

14. The system of claim 9, wherein the one or more server devices are configured to further cause the system to:
apply the translation neural network to the set of contextual identifiers and subsequent term sequences corresponding to subsequent subsets of frames of a scene to determine subsequent affinity scores for translations of the subsequent term sequences;
determine that the subsequent affinity scores for the translations of the subsequent term sequences satisfy a feedback threshold relative to the first affinity score;
based on determining that the subsequent affinity scores for the translations of the subsequent term sequences satisfy the feedback threshold, determine a set of weights for the set of contextual identifiers; and
based on the set of weights, generate an additional updated translation of the term sequence from the source language to the target language utilizing the translation neural network.

15. The system of claim 14, wherein the one or more server devices are configured to further cause the system to determine that the subsequent affinity scores for the translations of the subsequent term sequences satisfy the feedback threshold relative to the first affinity score:
determining that a number of the subsequent affinity scores denote a change relative to the first affinity score that satisfies the feedback threshold; and
determining that the number of the subsequent affinity scores satisfies the feedback threshold.

16. The system of claim 9, wherein the one or more server devices are configured to further cause the system to:
generate the contextual identifier by applying convolutional layers and long-short-term-memory (LSTM) layers from a contextual neural network to the set of frames to analyze the image features;
apply an encoder recurrent neural network and a decoder recurrent neural network from a translation neural network to the set of contextual identifiers and the term sequence to a translation by:
generating an encoded vector based on the term sequence and the set of contextual identifiers utilizing the encoder recurrent neural network from the translation neural network; and
generating the initial translation and the set of affinity scores based on the encoded vector utilizing the decoder recurrent neural network from the translation neural network.

17. A method comprising:
identifying, from a digital video file, a set of frames corresponding to a scene and a first term sequence and a second term sequence corresponding to the set of frames;
generating a contextual identifier for the set of frames based on image features of the set of frames utilizing a contextual neural network to analyze the image features;
based on the contextual identifier, utilizing a translation neural network to:
generate a first translation of the first term sequence and a first affinity score reflecting a first degree to which the contextual identifier is related to the first translation; and
generate a second translation of the second term sequence and a second affinity score reflecting a second degree to which the contextual identifier is related to the second translation; and
based on the second affinity score satisfying a feedback threshold relative to the first affinity score, generating an updated translation of the first term sequence utilizing the translation neural network.

18. The method of claim 17, further comprising determining that the second affinity score satisfies the feedback threshold relative to the first affinity score by:
identifying that the first translation of the first term sequence includes a first translated term in a target language for a term in a source language from the first term sequence;
identifying that the second translation of the second term sequence includes a second translated term in the target language for the term in the source language from the second term sequence, wherein the first translated term differs from the second translated term;
determining the first affinity score for the first translation reflects a first affinity between the contextual identifier and the first translated term and the second affinity score reflects a second affinity between the contextual identifier and the second translated term; and
determining that a difference between the first affinity score and the second affinity score satisfies the feedback threshold.

19. The method of claim 18, wherein generating the updated translation of the first term sequence utilizing the translation neural network comprises changing the first translated term to the second translated term.

20. The method of claim 17, wherein the first term sequence corresponds to a first subset of frames from the set of frames and the second term sequence corresponds to a second subset of frames from the set of frames.

* * * * *